United States Patent
Fakoorian et al.

(10) Patent No.: US 10,863,524 B2
(45) Date of Patent: Dec. 8, 2020

(54) MULTIPLEXING RULES FOR MIXED COMMUNICATION PROTOCOLS

(71) Applicant: QUALCOMM Incorporated, San Diego, CA (US)

(72) Inventors: Seyed Ali Akbar Fakoorian, San Diego, CA (US); Jing Sun, San Diego, CA (US); Xiaoxia Zhang, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/373,047

(22) Filed: Apr. 2, 2019

(65) Prior Publication Data

US 2019/0313419 A1 Oct. 10, 2019

Related U.S. Application Data

(60) Provisional application No. 62/652,732, filed on Apr. 4, 2018.

(51) Int. Cl.
*H04W 72/08* (2009.01)
*H04B 1/713* (2011.01)
(Continued)

(52) U.S. Cl.
CPC .......... *H04W 72/085* (2013.01); *H04B 1/713* (2013.01); *H04L 1/0013* (2013.01);
(Continued)

(58) Field of Classification Search
CPC ..... H04L 69/163; H04L 12/6418; H04L 1/22; H04L 2012/6459; H04L 2012/6475; H04L 2012/6478; H04L 2012/6481
See application file for complete search history.

(56) References Cited

U.S. PATENT DOCUMENTS 10,277,367 B2 * 4/2019 Nory .................. H04L 5/14
2011/0310855 A1 12/2011 Yin et al.

FOREIGN PATENT DOCUMENTS

WO WO-2017172447 A1 10/2017
WO WO-2018081105 A1 5/2018
WO WO-2019130522 A1 7/2019

OTHER PUBLICATIONS

International Search Report and Written Opinion—PCT/US2019/025592—ISA/EPO—dated Aug. 26, 2019.
(Continued)

*Primary Examiner* — Chandrahas B Patel
(74) *Attorney, Agent, or Firm* — Qualcomm Incorporated

(57) ABSTRACT

Methods, systems, and devices for wireless communications are described. In systems supporting multiple communication protocol types (e.g., ultra-reliable low-latency communication and enhance mobile broadband communication), a user equipment may implement multiplexing rules for handling overlapping transmissions of different communication protocols. For example, if lower latency data supports multiplexing with higher latency data and a lower latency resource overlaps (either partially or completely) with a higher latency resource, a number of options can be taken to control multiplexing. Similarly, if low latency uplink control information supports multiplexing with a slot-based physical uplink shared channel, and the physical uplink shared channel has its own uplink control information, a number of options can be taken to control multiplexing. If slot-based uplink control information overlaps (either partially or completely) with low latency data, then, likewise, a number of options can be taken to control multiplexing. Controlling multiplexing may support meeting low latency thresholds.

28 Claims, 15 Drawing Sheets

(51) Int. Cl.
*H04W 72/04* (2009.01)
*H04L 5/00* (2006.01)
*H04W 28/02* (2009.01)
*H04L 1/18* (2006.01)
*H04L 1/00* (2006.01)

(52) U.S. Cl.
CPC .......... *H04L 1/1819* (2013.01); *H04L 5/0055* (2013.01); *H04W 28/0278* (2013.01); *H04W 72/0413* (2013.01); *H04W 72/0473* (2013.01)

(56) References Cited

OTHER PUBLICATIONS

Panasonic: "Discussion on SR for URLLC and Multiplexing with HARQ-ACK", 3GPP TSG RAN WG1 NR Ad-Hoc#2, 3GPP Draft; R1-1710942, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 26, 2017 (Jun. 26, 2017), pp. 1-2, XP051300143, Retrieved from the Internet: URL: http://www.3gpp.org/ftp/Meetings_3GPP_SYNC/RAN1/Docs/ [retrieved on Jun. 26, 2017] the whole document.

ZTE, et al., "Study of Handling UL Multiplexing of Transmissions with Different Reliability Requirements", 3GPP TSG RAN WG1 Meeting #91, 3GPP Draft; R1-1801634 Study of Handling UL Multiplexing of Transmissions with Different Reliability Requirements, 3rd Generation Partnership Project (3GPP), Mobile Competence Centre; 659, Route Des, vol. RAN WG1, No. Athens, Greece; Feb. 26, 2018-Mar. 2, 2018, Feb. 16, 2018 (Feb. 16, 2018), pp. 1-5, XP051396977, Retrieved from the Internet: URL: http://www.3gpp.org/ftp/tsg%5Fran/WG1%5FRL1/TSGR1%5F92/Docs/ [retrieved on Feb. 16, 2018] the whole document.

Huawei, et al: "UCI Piggyback on PUSCH for URLLC," 3GPP Draft; R1-1801357, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018, XP051397521, 10 Pages, Retrieved from the Internet: URL: http://www.3gpp.org/ftp/tsg%5Fran/WG1%5FRL1/TSGR1%5F92/Docs/ [retrieved on Feb. 17, 2018].

Nokia et al: "UCI Multiplexing on PUSCH," 3GPP Draft; R1-1714080_UCI_ON_PUSCH, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051316870, 4 pages, Retrieved from the Internet: URL: http://www.3gpp.org/ftp/Meetings_3GPP_SYNC/RAN1/Docs/ [retrieved on Aug. 20, 2017].

Partial International Search Report—PCT/US2019/025592—ISA/EPO—dated Jun. 14, 2019.

* cited by examiner

MULTIPLEXING RULES FOR MIXED COMMUNICATION PROTOCOLS

CROSS REFERENCES

The present application for patent claims the benefit of U.S. Provisional Patent Application No. 62/652,732 by Fakoorian, et al., entitled "UCI MULTIPLEXING RULES FOR URLLC," filed Apr. 4, 2018, assigned to the assignee hereof, and expressly incorporated by reference herein.

BACKGROUND

The following relates generally to unlicensed, wireless communication, and more specifically to autonomous uplink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

SUMMARY

The present disclosure relates to methods, systems, devices, and apparatuses for handling overlapping transmissions of different communication protocols (e.g., an ultra-reliable low-latency communication (URLLC) protocol and an enhanced mobile broadband (eMBB) communication protocol). The methods, systems, devices, and apparatuses may be implemented by a user equipment (UE) or another device communicating on an uplink channel. In some cases, any of the methods, systems, devices, and apparatuses described herein may be combined in any combination to support or define multiplexing rules for handling overlapping transmissions of different communication protocols.

A method for wireless communications is described. The method may include identifying a first set of resources for a first transmission using a first communication protocol, identifying an overlap in time between the first set of resources and a second set of resources for a second transmission using a second communication protocol, where the first communication protocol is associated with a lower latency than the second communication protocol, processing the first transmission and the second transmission based on the overlap, and transmitting the first transmission based on the processing.

An apparatus for wireless communications is described. The apparatus may include a processor, memory in electronic communication with the processor, and instructions stored in the memory. The instructions may be executable by the processor to cause the apparatus to identify a first set of resources for a first transmission using a first communication protocol, identify an overlap in time between the first set of resources and a second set of resources for a second transmission using a second communication protocol, where the first communication protocol is associated with a lower latency than the second communication protocol, process the first transmission and the second transmission based on the overlap, and transmit the first transmission based on the processing.

Another apparatus for wireless communications is described. The apparatus may include means for identifying a first set of resources for a first transmission using a first communication protocol, identifying an overlap in time between the first set of resources and a second set of resources for a second transmission using a second communication protocol, where the first communication protocol is associated with a lower latency than the second communication protocol, processing the first transmission and the second transmission based on the overlap, and transmitting the first transmission based on the processing.

A non-transitory computer-readable medium storing code for wireless communications is described. The code may include instructions executable by a processor to identify a first set of resources for a first transmission using a first communication protocol, identify an overlap in time between the first set of resources and a second set of resources for a second transmission using a second communication protocol, where the first communication protocol is associated with a lower latency than the second communication protocol, process the first transmission and the second transmission based on the overlap, and transmit the first transmission based on the processing.

In some aspects of the method, apparatuses, and non-transitory computer-readable medium described herein, the processing may include operations, features, means, or instructions for refraining from transmitting the second transmission in the second set of resources based on the overlap, where the first transmission may be transmitted in the first set of resources.

In some aspects of the method, apparatuses, and non-transitory computer-readable medium described herein, the processing may include operations, features, means, or instructions for rate matching the second transmission around the first set of resources for the first transmission based on the overlap and transmitting the second transmission based on the rate matching, where the first transmission may be transmitted in the first resource. In some aspects of the method, apparatuses, and non-transitory computer-readable medium described herein, the second transmission may be transmitted on a subset of the second set of resources distinct in time from the first set of resources based on the rate matching.

In some aspects of the method, apparatuses, and non-transitory computer-readable medium described herein, the rate matching may include operations, features, means, or instructions for puncturing the second transmission for at least one symbol of the second set of resources with the first transmission. Some aspects of the method, apparatuses, and non-transitory computer-readable medium described herein may further include operations, features, means, or instructions for inserting a demodulation reference signal (DMRS) symbol into the second transmission following the first resource based on the puncturing the second transmission for the at least one symbol of the second set of resources with the first transmission. In some aspects of the method, apparatuses, and non-transitory computer-readable medium described herein, the inserting the DMRS symbol may include operations, features, means, or instructions for inserting the DMRS symbol into a first symbol of the second set of resources that directly follows the first set of resources, a symbol of the second set of resources preceding a subsequent frequency hop of the second transmission, or a combination thereof.

Some aspects of the method, apparatuses, and non-transitory computer-readable medium described herein may further include operations, features, means, or instructions for disabling frequency hopping for the second transmission based on the rate matching.

In some aspects of the method, apparatuses, and non-transitory computer-readable medium described herein, the processing may include operations, features, means, or instructions for transmitting the second transmission concurrently with at least a portion of the transmitting the first transmission based on the overlap.

Some aspects of the method, apparatuses, and non-transitory computer-readable medium described herein may further include operations, features, means, or instructions for allocating a first transmit power for the first transmission using the first communication protocol based on a block error rate (BLER) target and determining a second transmit power for the second transmission using the second communication protocol based on the allocated first transmit power and a maximum transmit power.

In some aspects of the method, apparatuses, and non-transitory computer-readable medium described herein, the first set of resources may overlap in time with a third set of resources including at least a portion of uplink control information (UCI) for the second communication protocol. Some aspects of the method, apparatuses, and non-transitory computer-readable medium described herein may further include operations, features, means, or instructions for transmitting at least the portion of UCI for the second communication protocol in a portion of the second set of resources different from the third set of resources and rate matching data for the second transmission following the first set of resources around the at least the portion of UCI based on the first set of resources overlapping in time with the third set of resources including at least the portion of UCI.

Some aspects of the method, apparatuses, and non-transitory computer-readable medium described herein may further include operations, features, means, or instructions for determining that concurrent transmission of the first transmission and the second transmission is disabled, transmitting the second transmission in the second set of resources, where UCI for the first transmission using the first communication protocol may be also transmitted in the second set of resources, and disabling frequency hopping based on the determining that concurrent transmission is disabled.

In some aspects of the method, apparatuses, and non-transitory computer-readable medium described herein, the second set of resources may include a set of frequency hopped resources and the transmitting the first transmission may include operations, features, means, or instructions for transmitting redundant coded bits of UCI for the first communication protocol in each frequency hopped resource of the set of frequency hopped resources, where data for the first communication protocol in each frequency hopped resource of the set of frequency hopped resources may be self-decodable based on the respective redundant coded bits of UCI.

In some aspects of the method, apparatuses, and non-transitory computer-readable medium described herein, the second set of resources may include a set of frequency hopped resources and the processing may include operations, features, means, or instructions for mapping coded bits of UCI associated with the first communication protocol to a first frequency hopped resource of the set of frequency hopped resources. In some aspects of the method, apparatuses, and non-transitory computer-readable medium described herein, the processing may include operations, features, means, or instructions for mapping coded bits of data associated with the first communication protocol to the first frequency hopped resource of the set of frequency hopped resources. In some aspects of the method, apparatuses, and non-transitory computer-readable medium described herein, a first bandwidth, a first time span, or both of the first frequency hopped resource of the set of frequency hopped resources may be larger than a second bandwidth, a second time span, or both for at least one other frequency hopped resource of the set of frequency hopped resources.

In some aspects of the method, apparatuses, and non-transitory computer-readable medium described herein, the second set of resources may include a set of frequency hopped resources and the processing may include operations, features, means, or instructions for mapping coded bits of hybrid automatic repeat request (HARQ) acknowledgment (ACK) associated with the first communication protocol to a first frequency hopped resource of the set of frequency hopped resources.

In some aspects of the method, apparatuses, and non-transitory computer-readable medium described herein, the processing may include operations, features, means, or instructions for refraining from transmitting the second transmission in the second set of resources based on the overlap, where the first transmission may be transmitted in the second set of resources.

In some aspects of the method, apparatuses, and non-transitory computer-readable medium described herein, the first transmission includes data for the first communication protocol and the second transmission includes UCI for the second communication protocol.

In some aspects of the method, apparatuses, and non-transitory computer-readable medium described herein, the processing may include operations, features, means, or instructions for determining whether to transmit the first transmission in the second set of resources based on a time span of the second set of resources, a coding gain associated with the second set of resources, or a combination thereof.

In some aspects of the method, apparatuses, and non-transitory computer-readable medium described herein, the processing may include operations, features, means, or instructions for refraining from transmitting at least a first portion of the second transmission in the second set of resources based on the overlap and transmitting at least a second portion of the second transmission in the second set of resources based on a priority level of the second portion of the second transmission. In some aspects of the method, apparatuses, and non-transitory computer-readable medium described herein, the second portion of the second transmission includes HARQ ACK coded bits, channel state information (CSI) part one coded bits, or a combination thereof.

In some aspects of the method, apparatuses, and non-transitory computer-readable medium described herein, the processing may include operations, features, means, or instructions for indicating the UCI for the second communication protocol using resource selection for transmitting the data for the first communication protocol, using multiplexing with a DMRS for the data for the first communication protocol, or using a combination thereof.

In some aspects of the method, apparatuses, and non-transitory computer-readable medium described herein, the first transmission includes data for the first communication protocol and the second transmission includes a scheduling request (SR), a buffer status report (BSR), or a combination thereof for the second communication protocol.

In some aspects of the method, apparatuses, and non-transitory computer-readable medium described herein, the processing may include operations, features, means, or instructions for jointly encoding the SR, the BSR, or the combination thereof for the second communication protocol with the data for the first communication protocol.

In some aspects of the method, apparatuses, and non-transitory computer-readable medium described herein, the processing may include operations, features, means, or instructions for transmitting the SR, the BSR, or the combination thereof for the second communication protocol in the first set of resources with the data for the first communication protocol.

In some aspects of the method, apparatuses, and non-transitory computer-readable medium described herein, the processing may include operations, features, means, or instructions for indicating the SR, the BSR, or the combination thereof for the second communication protocol using resource selection for transmitting the data for the first communication protocol.

In some aspects of the method, apparatuses, and non-transitory computer-readable medium described herein, the first communication protocol includes a URLLC protocol and the second communication protocol includes an eMBB protocol.

DETAILED DESCRIPTION

Figure 1:
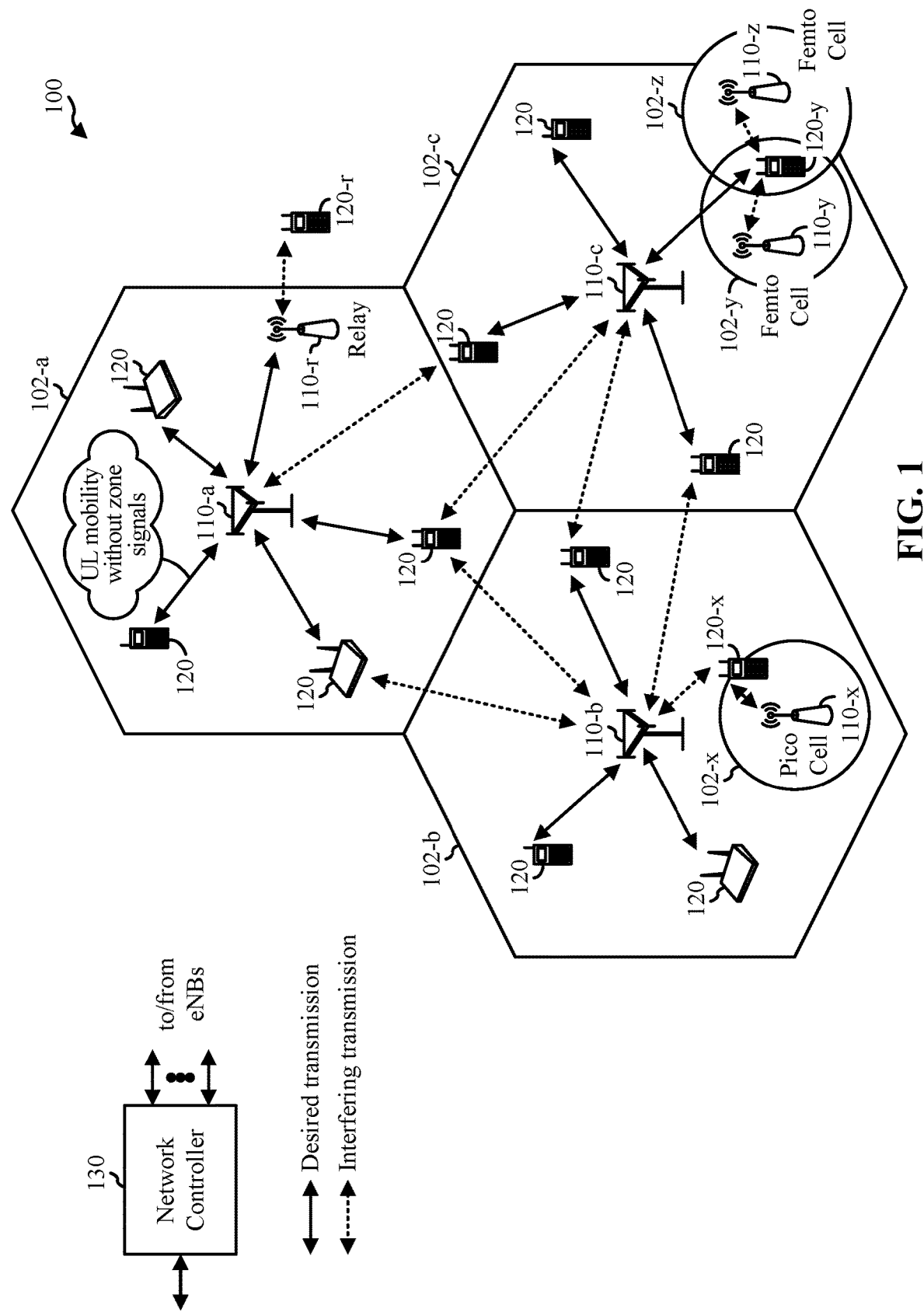
FIG. 1 illustrates an example of a wireless network that supports multiplexing rules for handling overlapping transmissions of different communication protocols in accordance with various aspects of the present disclosure.

In some wireless communications systems, such as 5th Generation (5G) New Radio (NR) systems, transmission waveforms may include cyclic prefix orthogonal frequency division multiplexing (CP-OFDM) and discrete Fourier transform-spread (DFT-S) OFDM. 5G allows for switching between both CP-OFDM and DFT-S-OFDM on the uplink (UL) to get the multiple input multiple output (MIMO) spatial multiplexing benefit of CP-OFDM and the link budget benefit of DFT-S-OFDM. With Long Term Evolution (LTE), orthogonal frequency division multiple access (OFDMA) communication signals may be used for downlink (DL) communications, while single-carrier frequency division multiple access (SC-FDMA) communication signals may be used for LTE UL communications. The DFT-s-OFDMA scheme spreads a set of data symbols (i.e., a data symbol sequence) over a frequency domain which is different from the OFDMA scheme. Also, in comparison to the OFDMA scheme, the DFT-s-OFDMA scheme can greatly reduce the peak to average power ratio (PAPR) of a transmission signal. The DFT-s-OFDMA scheme may also be referred to as an SC-FDMA scheme.

Scalable OFDM multi-tone numerology is another feature of 5G. Prior versions of LTE supported a mostly fixed OFDM numerology of fifteen (15) kilohertz (kHz) spacing between OFDM tones (often called subcarriers) and carrier bandwidths up to twenty (20) megahertz (MHz). Scalable OFDM numerology has been introduced in 5G to support diverse spectrum bands/types and deployment models. For example, 5G NR is able to operate in millimeter wave (mmW) bands that have wider channel widths (e.g., hundreds of MHz) than bands in use in LTE. Also, the OFDM subcarrier spacing may scale with the channel width, so the fast Fourier transform (FFT) size may also scale such that the processing complexity does not increase unnecessarily for wider bandwidths. In the present application, numerology may refer to the different values that different features (e.g., subcarrier spacing, cyclic prefix (CP), symbol length, FFT size, transmission time interval (TTI), etc.) of a communication system can take.

Also in 5G NR, cellular technologies have been expanded into the unlicensed spectrum (e.g., both stand-alone and licensed-assisted access (LAA)). In addition, the unlicensed spectrum may occupy frequencies up to sixty (60) gigahertz (GHz), also known as mmW. The use of unlicensed bands provides added capacity for communications in the system.

A first member of this technology family is referred to as LTE Unlicensed (LTE-U). By aggregating LTE in unlicensed spectrum with an 'anchor' channel in licensed spectrum, faster downloads are enabled for customers. Also, LTE-U may share the unlicensed spectrum fairly with Wi-Fi. This is an advantage because in the five (5) GHz unlicensed band where Wi-Fi devices are in wide use, it is desirable for LTE-U to coexist with Wi-Fi. However, an LTE-U network may cause radio frequency (RF) interference to an existing co-channel Wi-Fi device. Choosing a preferred operating channel and minimizing the interference caused to nearby Wi-Fi networks may be a goal for LTE-U devices. However, an LTE-U single carrier (SC) device may operate on the same channel as Wi-Fi if all available channels are occupied by Wi-Fi devices. To coordinate spectrum access between LTE-U and Wi-Fi, the energy across the intended transmission band may first be detected. This energy detection (ED) mechanism informs the device of ongoing transmissions by other nodes. Based on this ED information, a device decides if it should transmit on the intended transmission band. Wi-Fi devices may not back off for LTE-U transmissions unless the interference level caused by the LTE-U transmissions is above an ED threshold (e.g., negative sixty-two (−62) decibel-milliwatts (dBm) over 20 MHz). Thus, without proper coexistence mechanisms in place, LTE-U transmissions could cause considerable interference on a Wi-Fi network relative to Wi-Fi transmissions.

LAA is another member of the unlicensed technology family. Like LTE-U, it may also use an anchor channel in licensed spectrum. However, it also adds "listen before talk" (LBT) operations to the LTE functionality.

A gating interval may be used to gain access to a channel of a shared spectrum. The gating interval may determine the application of a contention-based protocol such as an LBT protocol. The gating interval may indicate when a clear channel assessment (CCA) is performed. Whether a channel of the shared unlicensed spectrum is available or in use is determined by the CCA. If the channel is "clear" for use, i.e., available, the gating interval may allow the transmitting apparatus to use the channel. Access to the channel is typically granted for a predefined transmission interval. Thus, with unlicensed spectrum, an LBT procedure is performed before transmitting a message. If the channel is not cleared for use, then a device will not transmit on the channel.

Another member of this family of unlicensed technologies is LTE-wireless local area network (WLAN) Aggregation (LWA), which may utilize both LTE and Wi-Fi. Accounting for both channel conditions, LWA can split a single data flow into two data flows which allows both the LTE and the Wi-Fi channel to be used for an application. Instead of competing with Wi-Fi, the LTE signal may use the WLAN connections seamlessly to increase capacity.

The final member of this family of unlicensed technologies is MulteFire. MulteFire opens up new opportunities by operating Fourth Generation (4G) LTE technology solely in unlicensed spectrum such as the global 5 GHz. Unlike LTE-U and LAA, MulteFire may support entities without any access to the licensed spectrum. Thus, it operates in unlicensed spectrum on a standalone basis (e.g., without any anchor channel in the licensed spectrum). Thus, MulteFire differs from LTE-U, LAA, and LWA because LTE-U, LAA, and LWA aggregate unlicensed spectrum with an anchor in licensed spectrum. Without relying on licensed spectrum as the anchoring service, MulteFire allows for Wi-Fi-like deployments. A MulteFire network may include access points (APs) and/or base stations communicating in an unlicensed radio frequency spectrum band (e.g., without a licensed anchor carrier).

Discovery reference signal (DRS) measurement timing configuration (DMTC) is a technique that allows MulteFire to transmit with minimal or reduced interference to other unlicensed technologies, including Wi-Fi. Additionally, the periodicity of discovery signals in MulteFire may be very sparse. This allows MulteFire to access channels occasionally, transmit discovery and control signals, and then vacate the channels. Since the unlicensed spectrum is shared with other radios of similar or dissimilar wireless technologies, a so-called LBT method may be applied for channel sensing. LBT may include sensing the medium for a pre-defined minimum amount of time and backing off if the channel is busy. Therefore, the initial random access (RA) procedure for standalone LTE-U may involve a minimal number of transmissions with low latency, such that the number of LBT operations may be minimized or reduced and the RA procedure may be completed quickly.

Leveraging a DMTC window, MulteFire algorithms may search and decode reference signals in unlicensed bands from neighboring base stations in order to find which base station to select to serve the user. As the caller moves past one base station, their user equipment (UE) may send a measurement report to the base station, triggering a handover procedure and transferring the caller (and all of their content and information) to the next base station.

Since LTE traditionally operates in licensed spectrum and Wi-Fi operates in unlicensed bands, coexistence with Wi-Fi or other unlicensed technology was not considered when LTE was designed. In moving to the unlicensed world, the LTE waveform was modified and algorithms were added in order to perform LBT. This may support the ability to share a channel with unlicensed incumbents, including Wi-Fi, by not immediately acquiring the channel and transmitting. The present example supports LBT and the detection and transmission of Wi-Fi Channel Usage Beacon Signals (WCUBSs) for ensuring coexistence with Wi-Fi neighbors.

MulteFire was designed to "hear" a neighboring Wi-Fi base station's transmission. MulteFire may listen first and autonomously make the decision to transmit when there is no other neighboring Wi-Fi transmitting on the same channel (e.g., within a threshold range). This technique may ensure co-existence between MulteFire and Wi-Fi transmissions.

The Third Generation Partnership Project (3GPP) and the European Telecommunications Standards Institute (ETSI) mandate an LBT detection threshold (e.g., a negative seventy-two (−72) dBm LBT detection threshold). This threshold may further help wireless devices avoid transmitting messages that interfere with Wi-Fi. MulteFire's LBT design may be similar or identical to the standards defined in 3GPP for LAA/enhanced LAA (eLAA) and may comply with ETSI rules.

An expanded functionality for 5G involves the use of 5G NR spectrum sharing (NR-SS). 5G NR-SS may enable enhancement, expansion, and/or upgrade of the spectrum sharing technologies introduced in LTE. These include LTE Wi-Fi Aggregation (LWA), LAA, eLAA, Citizen's Broadband Radio service (CBRS)/License Shared Access (LSA), or any combination of these technologies.

In some wireless communications systems, UEs may identify multiple sets of resources scheduled for different types of communications. For example, a UE may identify a first set of resources for a first transmission (e.g., an uplink transmission) using a first communication protocol and a second set of resources for a second transmission (e.g., a second uplink transmission) using a second communication protocol. The different communication protocols may correspond to different latency thresholds or requirements, different reliability thresholds or requirements, etc. For example, the first communication protocol may be associated with a lower latency than the second communication protocol. In some cases, this first communication protocol may be an ultra-reliable low-latency communication (URLLC) protocol and the second communication protocol may be an enhanced mobile broadband (eMBB) communication protocol. A URLLC transmission may refer to any transmission (e.g., of data, control information, etc.) with a quality of service (QoS) type corresponding to URLLC traffic and an eMBB transmission may refer to any other transmission (e.g., of data, control information, etc.) without this QoS type (e.g., with more relaxed latency constraints).

In some cases, the low latency resources (i.e., the first set of resources) may partially or completely overlap in time with the second set of resources. In these cases, the UE may perform processing (e.g., multiplexing) of the information in the first and second transmission to support low latency transmission of the URLLC information while efficiently utilizing the resources for both URLLC and eMBB communications. This processing may involve dropping the eMBB transmission, rate matching at least a portion of the eMBB transmission around the URLLC resources, multiplexing the URLLC and eMBB transmissions in a same set of resources (e.g., the eMBB resources), jointly encoding the URLLC and eMBB information into a single packet for transmission, or some combination of these processes. Performing the processing based on identifying the overlap in time of the URLLC and eMBB resources may support multiplexing rules for efficiently handling URLLC.

Aspects of the disclosure are initially described in the context of a wireless network. Aspects of the disclosure are then illustrated by and described with reference to apparatus diagrams, system diagrams, and flowcharts that relate to multiplexing rules for handling overlapping transmissions of different communication protocols. As described herein, communications may additionally or alternatively support receiving on transmit and transmitting on receive.

FIG. 1 illustrates an example wireless network 100 that supports multiplexing rules for handling overlapping transmissions of different communication protocols in accordance with various aspects of the present disclosure. The wireless network 100 may include a number of base stations 110 and other network entities. A base station 110 may be a station that communicates with UEs 120. Each base station 110 may provide communication coverage for a particular geographic area. In 3GPP, the term "cell" may refer to a coverage area of a Node B and/or a Node B subsystem serving this coverage area, depending on the context in which the term is used. In NR systems, the term "cell" and evolved Node B (eNB), Node B, 5G NB, AP, NR base station, 5G Radio NodeB (gNB), or transmission/reception point (TRP) may be interchangeable. In some aspects, a cell may not necessarily be stationary, and the geographic area of the cell may move according to the location of a mobile base station 120. In some aspects, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A base station 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs in a Closed Subscriber Group (CSG), UEs for users in the home, etc.). A base station 110 for a macro cell may be referred to as a macro base station. A base station for a pico cell may be referred to as a pico base station. A base station for a femto cell may be referred to as a femto base station or a home base station. In the example shown in FIG. 1, the base stations 110-a, 110-b, and 110-c may be macro base stations for the macro cells 102-a, 102-b, and 102-c, respectively. The base station 110-x may be a pico base station for a pico cell 102-x. The base stations 110-y and 110-z may be femto base stations for the femto cells 102-y and 102-z, respectively. A base station may support one or multiple (e.g., three) cells.

The wireless network 100 may also include relay stations. A relay station is a station that receives a transmission of data and/or other information from an upstream station (e.g., a base station 110 or a UE 120) and sends a transmission of the data and/or other information to a downstream station (e.g., a UE 120 or a base station 110). A relay station may also be a UE 120 that relays transmissions for other UEs 120. In the example shown in FIG. 1, a relay station 110-r may communicate with the base station 110-a and a UE 120-r in order to facilitate communication between the base station 110-a and the UE 120-r. A relay station may also be referred to as a relay base station, a relay, etc.

The wireless network 100 may be a heterogeneous network that includes base stations 110 of different types, e.g., macro base stations, pico base stations, femto base stations, relays, etc. These different types of base stations may have different transmit power levels, different coverage areas, and may have differing impacts on interference in the wireless network 100. For example, a macro base station may have a high transmit power level (e.g., 20 Watts) whereas a pico base station, or a femto base station, or a relay may have a lower transmit power level (e.g., one (1) Watt).

The wireless network 100 may support synchronous or asynchronous operation. For synchronous operation, the base stations 110 may have similar frame timing, and transmissions from different base stations 110 may be approximately aligned in time. For asynchronous operation, the base stations 110 may have different frame timing, and transmissions from different base stations 110 may not be aligned in time. The techniques described herein may be used for both synchronous and asynchronous operation.

A network controller 130 may be coupled with a set of base stations 110 and provide coordination and control for these base stations 110. The network controller 130 may communicate with the base stations 110 via a backhaul. The base stations 110 may also communicate with one another, e.g., directly or indirectly via wireless or wireline backhaul.

The UEs 120 (e.g., 120-x, 120-y, etc.) may be dispersed throughout the wireless network 100, and each UE may be stationary or mobile. A UE 120 may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., global positioning system (GPS), Beidou, terrestrial, etc.), or any other suitable device that is configured to communicate via a wireless or wired medium.

Some UEs 120 may be considered machine-type communication (MTC) devices or evolved MTC (eMTC) devices, which may include remote devices that may communicate with a base station 110, another remote device, or some other entity. MTC may refer to communication involving at least one remote device on at least one end of the communication and may include forms of data communication which involve one or more entities that do not necessarily need human interaction. MTC UEs may include UEs 120 that are capable of MTC communications with MTC servers and/or other MTC devices through Public Land Mobile Networks (PLMNs), for example. MTC and enhanced MTC (eMTC) UEs include, for example, robots, drones, remote devices, sensors, meters, monitors, cameras, location tags, etc., that may communicate with a base station 110, another device (e.g., remote device), or some other entity. A wireless node may provide, for example, connectivity for or to a network (e.g., a wide area network such as the Internet or a cellular network) via a wired or wireless communication link. MTC UEs, as well as other UEs 120, may be implemented as Internet-of-Things (IoT) devices, e.g., narrowband IoT (NB-IoT) devices. In NB IoT, the UL and DL have higher periodicities and repetitions interval values as a UE 120 decodes data in extended coverage.

In FIG. 1, a solid line with double arrows indicates desired transmissions between a UE 120 and a serving base station, which is a base station 110 designated to serve the UE 120 on the DL and/or UL. A dashed line with double arrows indicates interfering transmissions between a UE 120 and a base station 110.

Certain wireless networks (e.g., LTE) utilize OFDM on the DL and single-carrier frequency division multiplexing (SC-FDM) on the UL. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers, K, may be dependent on the system bandwidth. For example, the spacing of the subcarriers may be 15 kHz and the minimum resource allocation (called a 'resource block') may be twelve (12) subcarriers (or one hundred eighty (180) kHz). Consequently, the nominal FFT size may be equal to one hundred and twenty-eight (128), two hundred and fifty-six (256), five hundred and twelve (512), one thousand twenty-four (1024), or two thousand forty-eight (2048) for system bandwidth of 1.25, 2.5, 5, 10 or 20 MHz, respectively. The system bandwidth may also be partitioned into subbands. For example, a subband may cover 1.08 MHz (e.g., six (6) resource blocks), and there may be 1, two (2), four (4), eight (8), or sixteen (16) subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR or other wireless communications systems. NR may utilize OFDM with a CP on the UL and DL and may include support for half-duplex operation using time division duplex (TDD). A single component carrier bandwidth of one hundred (100) MHz may be supported. NR resource blocks may span 12 subcarriers with a subcarrier bandwidth of seventy-five (75) kHz over a 0.1 milliseconds (ms) duration. Each radio frame may consist of fifty (50) subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes (e.g., for NR) may be described in more detail with respect to FIGS. 5A and 5B. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE 120. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) and/or distributed units (DUs).

In some aspects, access to the air interface may be scheduled, where a scheduling entity (e.g., a base station 110) allocates resources for communication among some or all devices and equipment within its service area or cell. Within the present disclosure, as discussed further herein, the scheduling entity may be responsible for scheduling, assigning, reconfiguring, and releasing resources for one or more subordinate entities. That is, for scheduled communication, subordinate entities utilize resources allocated by the scheduling entity. Base stations 110 are not the sole entities that may function as a scheduling entity. That is, in some aspects, a UE 120 may function as a scheduling entity, scheduling resources for one or more subordinate entities (e.g., one or more other UEs 120). In this aspect, a first UE 120 is functioning as a scheduling entity, and other UEs 120 utilize resources scheduled by the first UE 120 for wireless communication. A UE 120 may function as a scheduling entity in a peer-to-peer (P2P) network and/or in a mesh network. In a mesh network example, UEs 120 may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As discussed herein, a radio access network (RAN) may include a CU and one or more DUs. An NR base station (e.g., eNB, 5G Node B, Node B, TRP, AP, or gNB) may correspond to one or multiple base stations 110. NR cells may be configured as access cell (ACells) or data only cells (DCells). For example, the RAN (e.g., a CU or DU) may configure the cells. DCells may be cells used for carrier aggregation or dual connectivity, but not used for initial access, cell selection/reselection, or handover. In some cases, DCells may not transmit synchronization signals (SS), and in other cases, DCells may transmit SS. NR base stations may transmit DL signals to UEs 120 indicating the cell type. Based on the cell type indication, the UE 120 may communicate with the NR base station. For example, the UE 120 may determine NR base stations to consider for cell selection, access, handover, and/or measurement based on the indicated cell type.

In some wireless networks 100, UEs 120 may implement multiplexing rules for uplink transmissions (e.g., URLLC transmissions). A deadline constraint for the transmission of URLLC data may exist (e.g., based on regional policies, regulations, etc). Specifically, with regard to a latency requirement for URLLC transmissions, a UE 120 may transmit data packets before a transmission deadline (e.g., where the deadline is based on the latency requirement).

The transmission deadline may correspond to a time instant (e.g., an occasion in time) by which the network entity (e.g., a base station 110) successfully receives the transmission of a data packet from a UE 120. Once the transmission deadline expires, the data packet may not be of use and/or may not be successfully received. Each URLLC data packet may be provided with enough resources (e.g., bandwidth) in each hybrid automatic repeat request (HARD) transmission to satisfy a maximum block error rate (BLER) before the expiration of the transmission deadline.

In some cases, an uplink transmission may include uplink control information (UCI). UCI may be carried by a physical uplink control channel (PUCCH), a physical uplink shared channel (PUSCH), or some combination of these. UCI is a counterpart to the downlink control information (DCI) which is carried by a physical downlink control channel (PDCCH). However, the information carried in UCI may be small compared to the information in DCI. The PUSCH may be used by a UE 120 to carry UCI, application data, and/or uplink radio resource control (RRC) messages. A scheduling resource block (SRB) may also use the PUSCH, and each connection between devices (e.g., a UE 120 and base station 110) may have its own unique SRB. A UE 120 may transmit UCI using PUSCH, instead of PUCCH, when there is application data and RRC to be transferred at the same time occasion (e.g., the same instant in time).

UCI may include any combination of hybrid automatic repeat request (HARQ) acknowledgment/negative acknowledgment (ACK/NACK) information, scheduling request (SR) information, and a channel quality indicator (CQI). A UE 120 may transmit certain combinations of these three pieces of information depending on the situation. Sometimes the transmitted UCI carries only SR, sometimes it carries SR and HARQ ACK/NACK together, etc. In some cases, the UE 120 may transmit the UCI on the PUSCH unless the PUSCH transmission corresponds to a random access response (RAR) grant or a retransmission of a same transport block (TB) as part of a contention-based random access (RACH) procedure, in which case the UCI is not transmitted on the PUSCH.

When the UE 120 transmits user data, the UE 120 may use the PUSCH to additionally or alternatively transmit the user data. In such cases, the UE 120 may not use the PUCCH, and instead the PUSCH may carry the UCI. When there is no user data to be transmitted, the UE 120 may use the PUCCH to carry UCI. In some cases, the UE 120 may select to transmit on the PUCCH or PUSCH within a symbol, slot, subframe, or other transmission time interval (TTI).

URLLC applications may implement stringent latency-reliability requirements. For example, for factory automation, there can be two types of applications, Type 1 and Type 2. These applications may have configured or specified latency and/or reliability requirements, such that Type 1 specifies a latency of less than 10 milliseconds (ms) and a reliability of $1\text{-}10^{-9}$ BLER and Type 2 specifies a latency of 10 ms to 50 ms and a reliability of $1\text{-}10^{-6}$ to $1\text{-}10^{-9}$ BLER.

To meet the tough target reliability (e.g., a reliability requirement for URLLC), highly reliable uplink control may be used with URLLC traffic. The highly reliable uplink control may work to keep NACK-to-ACK (N2A) error low. While ACK-to-NACK (A2N) error may impact latency, N2A error may impact both latency and reliability. Additionally or alternatively, to meet the target latency requirements (e.g., a latency requirement for URLLC), multiplexing of UCI on PUSCH (i.e., UCI "piggybacking" on the PUSCH) is supported. N2A error refers to a type of error in which a NACK message is inferred as an ACK (e.g., a NACK is transmitted but the receiver decodes the message as an ACK). A2N error refers to a type of error in which an ACK message is inferred as a NACK (e.g., an ACK is transmitted but the receiver decodes the message as a NACK). In some systems, UEs 120 may not support simultaneous transmission on the PUSCH and the PUCCH. Additionally or alternatively, NR design may be compatible with URLLC applications in one or more ways. For example, when the UCI is carried by the PUCCH, a UE 120 may use short PUCCH with repetition to achieve both reliability and latency. Furthermore, a dynamic beta offset, $\beta_{offset}$, may be supported for multiplexing UCI on PUSCH to allow for a tradeoff between the reliability of the UCI and the PUSCH. The beta offset may be an example of a parameter which represents the number of resource elements used to represent coded bits (e.g., how many resource elements (REs) are used to represent a UCI payload). The greater the beta offset, the greater the REs used to code the UCI (e.g., lower code rate), and the smaller the beta offset, the fewer the REs used to code the UCI (e.g., higher code rate).

The present method and apparatus supports rules for processing (e.g., multiplexing) UCI for URLLC applications. For example, as disclosed herein, wireless devices (e.g., UEs 120, base stations 110, etc.) may support further enhancement of UCI multiplexing on PUSCH, where the PUSCH supports signals/channels compatible with URLLC. In a first aspect supporting multiplexing UCI on a PUSCH, a UE 120 may multiplex URLLC information (e.g., PUSCH and/or UCI) on non-URLLC information (e.g., PUSCH and/or UCI). In a second aspect supporting multiplexing UCI on a PUSCH, the UE 120 may multiplex non-URLLC information (e.g., PUSCH and/or UCI) on URLLC information (e.g., PUSCH and/or UCI). URLLC information may refer to information (e.g., data and/or control) with a QoS type corresponding to URLLC traffic. Non-URLLC (or eMBB) information may refer to the rest of the information (e.g., data and/or control) As described herein, the concept of "data" or "information" may refer to either UCI, or PUSCH (e.g., uplink data), or both. Furthermore, piggybacking UCI on a PUSCH may refer to piggybacking URLLC UCI on eMBB (or non-URLLC) PUSCH or piggybacking non-URLLC (or eMBB) UCI on URLLC PUSCH.

In the wireless network 100, in some cases, time may be divided into one ms duration slots for URLLC communications. If tight latency constraints are to be satisfied in a URLLC communication system, URLLC traffic may not be queued until the next slot becomes available. Instead, each slot may be divided into mini-slots, and mini-slot-based scheduling may be performed by a wireless device, instead of slot-based scheduling.

For slot-based scheduling, for HARQ-ACKs with more than two bits (where HARQ-ACKs are one type of UCI), a UE 120 may perform rate matching on the PUSCH. For slot-based scheduling, for HARQ-ACKs with up to two bits (including two bits), the UE 120 may puncture the PUSCH. For rate matching, the encoder identifies which REs are not used at the time of encoding, while for puncturing the encoder may not identify this information and may instead operate as if punctured REs will be used. As such, in some wireless networks 100, the HARQ-ACK is processed (e.g., multiplexed) with the PUSCH by rate matching if the HARQ-ACK has more than two bits and by puncturing if the HARQ-ACK has two bits or fewer.

In some cases, the wireless network 100 may support frequency hopping for PUSCH. If frequency hopping for PUSCH is enabled, the N1 modulation symbols of a HARQ-ACK portion of UCI may be partitioned into multiple parts (e.g., HARQ-ACK part A and HARQ-ACK part B for two frequency hopped resources), where part A has a floor (N1/2) of modulation symbols and part B has ceiling (N1/2) of modulation symbols. HARQ-ACK part A may be mapped to a first frequency hopped resource (e.g., in a first frequency region), and HARQ-ACK part B may be mapped to a second frequency hopped resource (e.g., in a second frequency region). The range for the N1 modulation symbols may depend on beta (e.g., the beta offset) and the number of REs.

In the floor function, a real number x is input and the greatest integer less than or equal to x is returned as output, denoted by floor (x)=⌊x⌋. Similarly, the ceiling function, denoted as ceiling (x)=⌈x⌉, maps x to the least integer greater than or equal to x.

Similarly, if frequency hopping for PUSCH is enabled, the N2 modulation symbols of a CSI part 1 portion of UCI may be partitioned into CSI part 1A and CSI part 1B, where part 1A has floor (N2/2) and part 1B has ceiling (N2/2) modulation symbols. CSI part 1A may be mapped to the first hop (e.g., a first frequency hopped resource of a set of frequency hopped resources) and CSI part 1B may be mapped to the second hop (e.g., a second frequency hopped resource of the set of frequency hopped resources). The range for the N2 modulation symbols may depend on beta (e.g., the beta offset) and the number of REs.

Likewise, if frequency hopping for PUSCH is enabled, the N3 modulation symbols of a CSI part 2 portion of UCI may be partitioned into CSI part 2A and CSI part 2B, where part 2A has floor (N3/2) and part 2B has ceiling (N3/2) modulation symbols. CSI part 2A may be mapped to the first hop and CSI part 2B may be mapped to the second hop. The range for the N3 modulation symbols may depend on beta and the number of REs.

In some cases, the wireless network 100 may support mapping UCI types. When multiplexing a modulated HARQ-ACK symbol on a PUSCH, the modulated HARQ-ACK symbols may be mapped starting on the first available non-DMRS symbol after the first DMRS symbol(s) (e.g., regardless of the number of DMRS symbols in the PUSCH transmission).

When multiplexing a CSI part 1 symbol on a PUSCH, modulated CSI part 1 symbols may be mapped starting on the first available non-DMRS symbol (e.g., regardless of the number of DMRS symbols in PUSCH transmission). CSI part 1 symbols may not be mapped on reserved HARQ-ACK REs in cases where the HARQ-ACK symbols puncture a PUSCH. Additionally or alternatively, CSI part 1 symbols may not be mapped on HARQ-ACK REs in cases where the PUSCH is rate matched around HARQ-ACK symbols.

Modulated CSI part 2 symbols may be mapped starting on the first available non-DMRS symbol (e.g., regardless of the number of DMRS symbols in a PUSCH transmission). CSI part 2 symbols may be mapped on the reserved HARQ-ACK REs in the case of HARQ-ACK symbols puncturing the PUSCH. Additionally or alternatively, CSI part 2 symbols may not be mapped on reserved HARQ-ACK REs in the case of PUSCH being rate matched around HARQ-ACK symbols. In some cases, CSI part 2 may not be mapped on CSI part 1 REs.

For multiplexing UCI on PUSCH, wireless devices may support dynamic beta offset indications, semi-static beta offset indications, or both. One table of beta offset values may be used for HARQ-ACK in NR systems. Another table of beta offset values may be used for both CSI part 1 and CSI part 2 in NR systems. Both tables may contain thirty-two entries.

To multiplex the CQI and ACK/NACK with the PUSCH, beta offset parameters may be used that are set by higher layers. In some cases, the CQI_offset parameter discloses the number of REs used when multiplexing CQI symbols with the PUSCH, while the HARQ-ACK/NACK offset describes the number of REs used when multiplexing ACK/NACK symbols with the PUSCH.

If a PUSCH is scheduled in a subframe where a LE 120 transmits UCI, such as CSI, ACK/NACK, etc., the UCI may be piggybacked on the PUSCH. In a first aspect, the UE 120 may multiplex URLLC data on non-URLLC (or slot-based) data, where data can be UCI, or PUSCH, or both. More specifically, URLLC data may be multiplexed on a non-URLLC (or slot-based) PUSCH.

The UEs 120 in the wireless network 100 may use any of the techniques described herein in conjunction with multiplexing rules to handle overlapping transmissions of different communication protocols (e.g., overlapping URLLC and eMBB data). The base stations 110 in the wireless network 100 may additionally follow the multiplexing rules to successfully receive the uplink transmissions from the UEs 120. For example, a UE 120 may process a URLLC transmission and an eMBB transmission based on the resources for the two transmissions overlapping. A base station 110 monitoring for the transmissions may determine the processing based on the resource overlap and may monitor for and receive the transmissions based on the processing. By performing the processing, the UE 120 may meet a URLLC reliability metric, a URLLC latency metric, or both for the transmission of the URLLC information.

Figure 2:
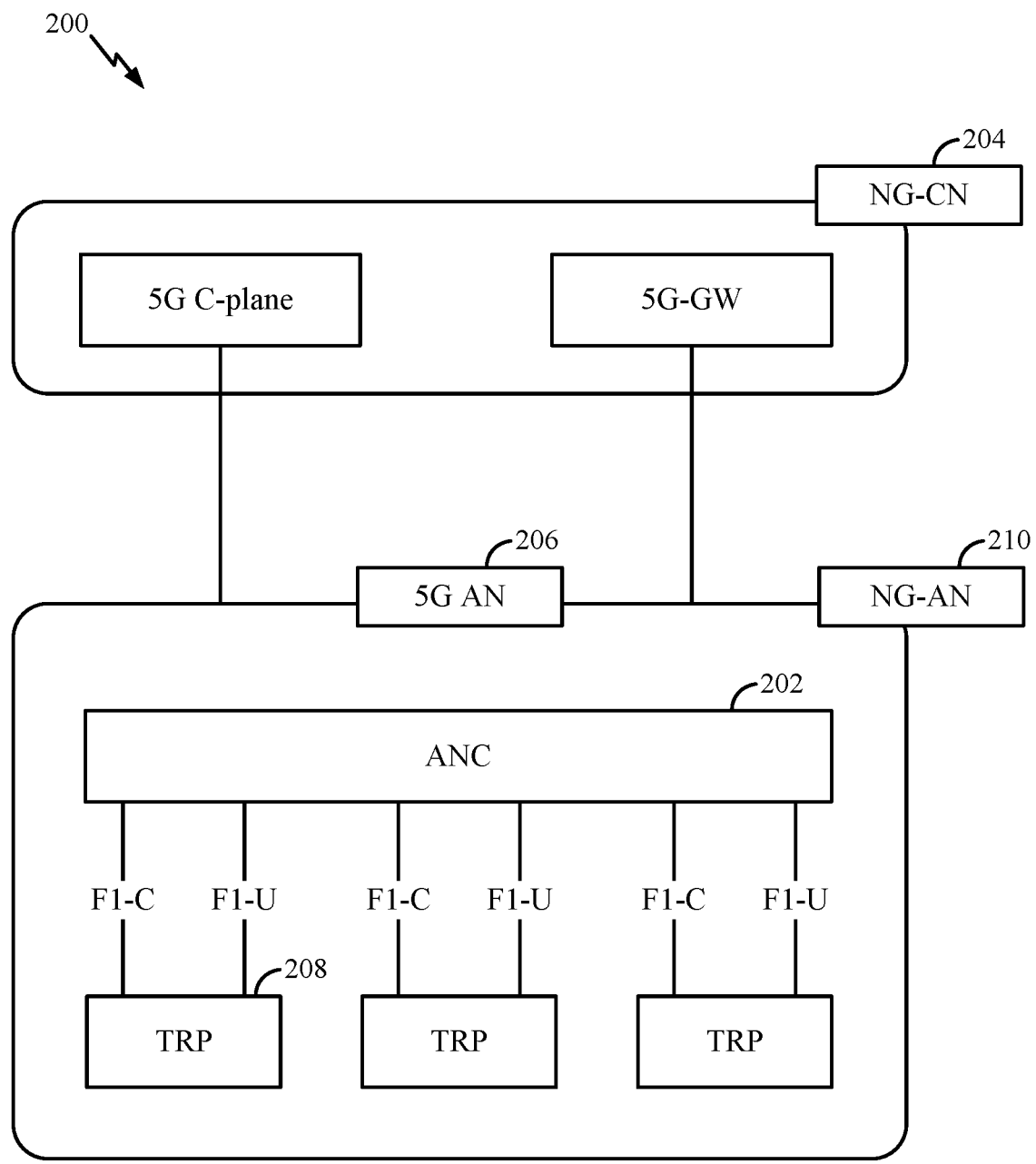
FIG. 2 illustrates an example logical architecture of a distributed radio access network (RAN) that supports multiplexing rules for handling overlapping transmissions of different communication protocols in accordance with various aspects of the present disclosure.

FIG. 2 illustrates an example logical architecture of a distributed radio access network (RAN) 200 (e.g., which may be implemented in the wireless communications system illustrated in FIG. 1) that supports multiplexing rules for handling overlapping transmissions of different communication protocols in accordance with various aspects of the present disclosure. A 5G access node 206 may include an access node controller (ANC) 202. The ANC may be a CU of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as base stations, NR base stations, Node Bs, 5G NBs, APs, eNBs, gNBs, or some other term). As described herein, a TRP 208 may be used interchangeably with "cell."

The TRPs 208 may be examples of DUs. The TRPs 208 may be connected to one ANC (e.g., ANC 202) or more than one ANC. For example, for RAN sharing, radio as a service (RaaS), and service specific ANC deployments, the TRP 208 may be connected to more than one ANC 202. A TRP 208 may include one or more antenna ports. The TRPs 208 may be configured to individually (e.g., in dynamic selection) or jointly (e.g., in joint transmission) serve traffic to a UE.

The local architecture may be used to illustrate fronthaul definition. The architecture may be defined such that it may support fronthauling solutions across different deployment types. For example, the architecture may be based on transmit network capabilities (e.g., bandwidth, latency, and/or jitter).

The architecture may share features and/or components with LTE. According to aspects, the NG-AN 210 may support dual connectivity with NR. The NG-AN 210 may share a common fronthaul for LTE and NR.

The architecture may enable cooperation between and among TRPs 208. For example, cooperation may be preset within a TRP 208 and/or across TRPs 208 via the ANC 202. According to aspects, no inter-TRP interface may be needed/present.

According to aspects, a dynamic configuration of split logical functions may be present within the architecture. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP 208 or ANC 202, respectively). According to certain aspects, a base station may include a CU (e.g., ANC 202) and/or one or more distributed units (e.g., one or more TRPs 208).

The distributed RAN 200 may support multiplexing rules for handling overlapping transmissions of different communication protocols. For example, one or more UEs 120 supported by the distributed RAN 200 may communicate on the uplink based on the multiplexing rules with one or more TRPs 208 (e.g., DUs).

Figure 3:
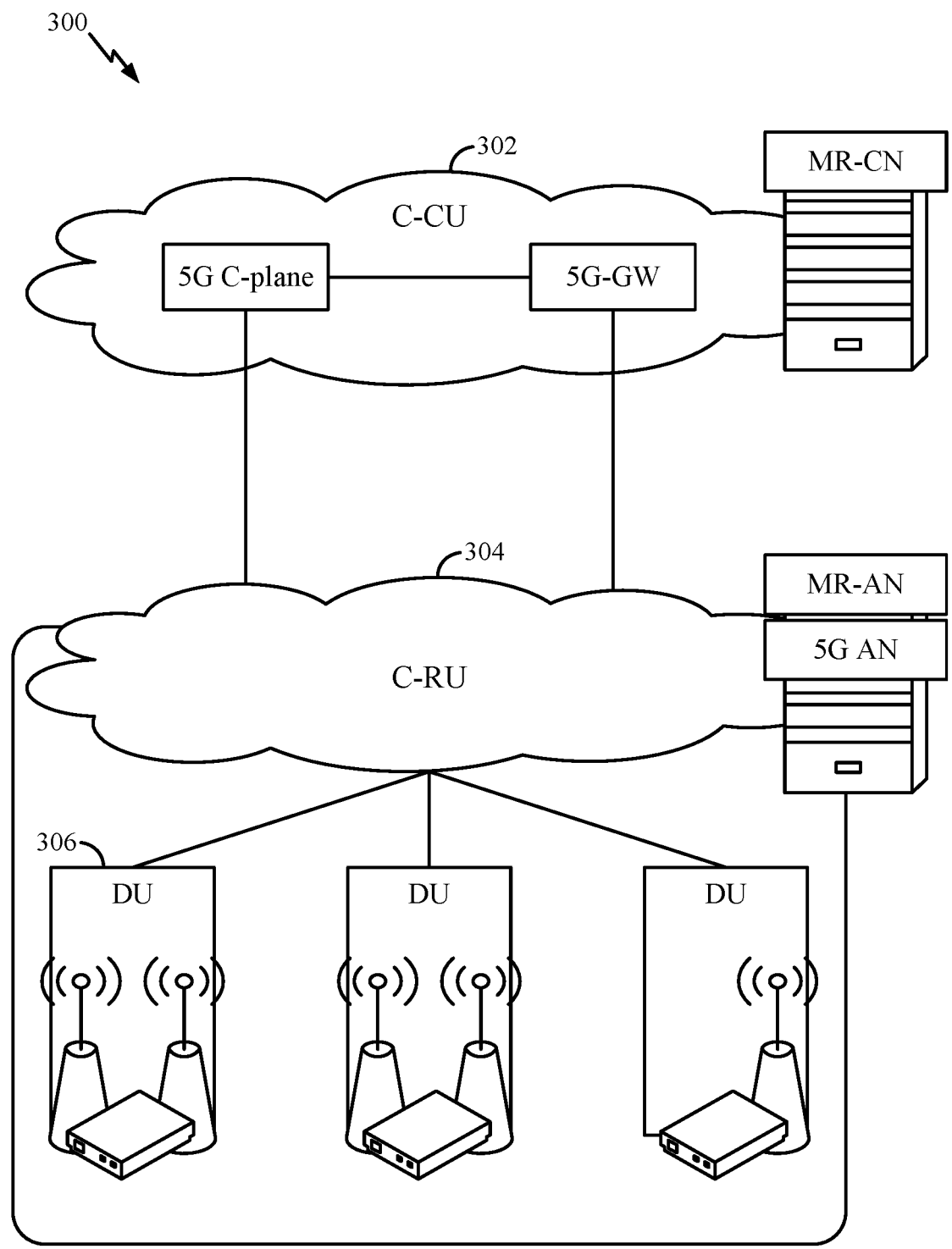
FIG. 3 illustrates an example physical architecture of a distributed RAN that supports multiplexing rules for handling overlapping transmissions of different communication protocols in accordance with various aspects of the present disclosure.

FIG. 3 illustrates an example physical architecture of a distributed RAN 300 that supports multiplexing rules for handling overlapping transmissions of different communication protocols in accordance with various aspects of the present disclosure. A centralized core network unit (C-CU) 302 may host core network functions. The C-CU 302 may be centrally deployed. C-CU 302 functionality may be off-loaded (e.g., to advanced wireless services (AWSs)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be closer to the network edge.

A DU 306 may host one or more TRPs (e.g., edge nodes (ENs), edge units (EUs), radio heads (RHs), smart radio heads (SRHs), or the like). The DU 306 may be located at edges of the network with RF functionality.

The distributed RAN 300 may support multiplexing rules for handling overlapping transmissions of different communication protocols. For example, one or more UEs 120 supported by the distributed RAN 300 may communicate on the uplink based on the multiplexing rules with one or more DUs 306.

Figure 4:
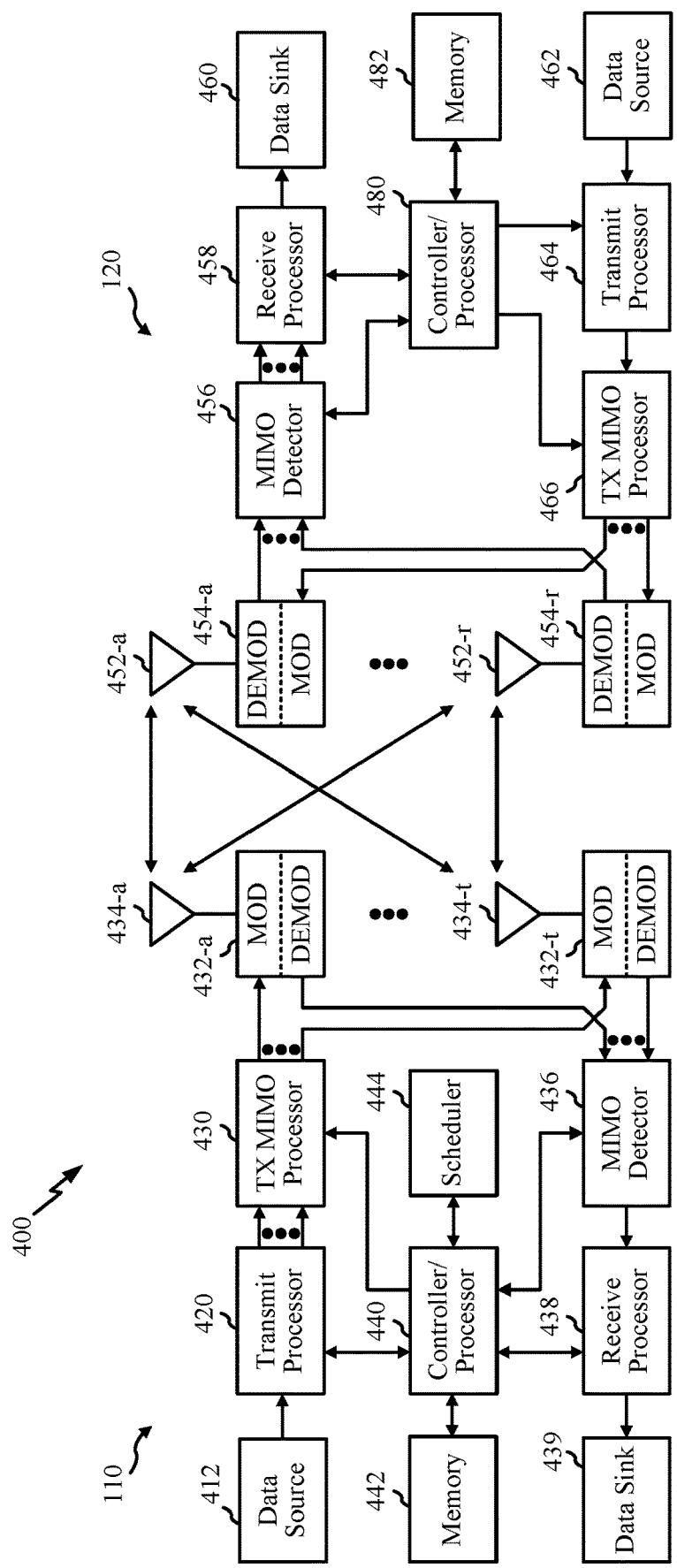
FIG. 4 illustrates an example of a wireless communications system that supports multiplexing rules for handling overlapping transmissions of different communication protocols in accordance with various aspects of the present disclosure.

FIG. 4 illustrates an example of a wireless communications system 400 that supports multiplexing rules for handling overlapping transmissions of different communication protocols in accordance with various aspects of the present disclosure. The wireless communications system 400 may include a base station 110 and a UE 120 (e.g., as described with reference to FIG. 1), where components of the base station 110 and UE 120 are illustrated in FIG. 4. As described herein, the base station 110 may include one or more TRPs. One or more components of the base station 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the base station 110 may be used to perform the operations described herein.

FIG. 4 shows a block diagram of a design of a base station 110 and a UE 120, which may be one of the base stations and one of the UEs described with reference to FIG. 1. For a restricted association scenario, the base station 110 may be the macro base station 110-*c* in FIG. 1, and the UE 120 may be the UE 120-*y*. The base station 110 may also be a base station of some other type. The base station 110 may be equipped with antennas 434-*a* through 434-*t*, and the UE 120 may be equipped with antennas 452-*a* through 452-*r*.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid Automatic repeat request (ARQ) Indicator Channel (PHICH), Physical Downlink Control Channel (PDCCH), etc. The data may be for the Physical Downlink Shared Channel (PDSCH), etc. The transmit processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), cell-specific reference signal, etc. A transmit (TX) MIMO processor 430 may perform spatial processing (e.g., precoding) on the data symbols, the control symbols, and/or the reference symbols, if applicable, and may provide output symbol streams to the modulators 432-*a* through 432-*t*. For example, the TX MIMO processor 430 may perform certain aspects described herein for reference signal (RS) multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a DL signal. DL signals from modulators 432-*a* through 432-*t* may be transmitted via the antennas 434-*a* through 434-*t*, respectively.

At the UE 120, the antennas 452-*a* through 452-*r* may receive the DL signals from the base station 110 and may provide received signals to the demodulators 454-*a* through 454-*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454-*a* through 454-*r*, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, coordinated multi-point (CoMP) aspects can include providing the antennas, as well as some Tx/receive (Rx) functionalities, such that they reside in DUs. For example, some Tx/Rx processing may be done in the CU, while other processing can be done at the DUs. In accordance with one or more aspects as shown in the diagram, the base station MOD/DEMODs 432 may be in the DUs.

On the UL, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454-a through 454-r (e.g., for SC-FDM, etc.), and transmitted to the base station 110. At the base station 110, the UL signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the base station 110 and the UE 120, respectively. A scheduler 444 may schedule UEs for data transmission on the DL and/or UL.

In some cases, the wireless communications system 400 may support multiplexing rules for handling overlapping transmissions of different communication protocols (e.g., URLLC and eMBB). For example, a UE 120 may identify a first set of resources for a first transmission using a first communication protocol (e.g., URLLC). In some aspects, the controller/processor 480, transmit processor 464, and/or some other component of the UE 120 may identify the first set of resources. The UE 120 (e.g., using the controller/processor 480, the transmit processor 464, and/or the other component of the UE 120) may identify an overlap in time between the first set of resources and a second set of resources for a second transmission using a second communication protocol (e.g., eMBB). In these cases, the first communication protocol may be associated with a lower latency than the second communication protocol. The UE 120 may process (e.g., multiplex) the first transmission and the second transmission based on the overlap (e.g., using the controller/processor 480, the transmit processor 464, and/or some other component of the UE 120) and may transmit the first transmission based on the processing and using one or more modulators 454 and antennas 452. In some cases, the UE 120 may additionally transmit the second transmission (e.g., after rate matching, puncturing, piggybacking, joint encoding, etc.) using one or more modulators 454 and antennas 452. A base station 110 may receive the uplink information transmitted by the UE 120 and may process the information based on the multiplexing rules implemented by the UE 120.

Figure 5A:
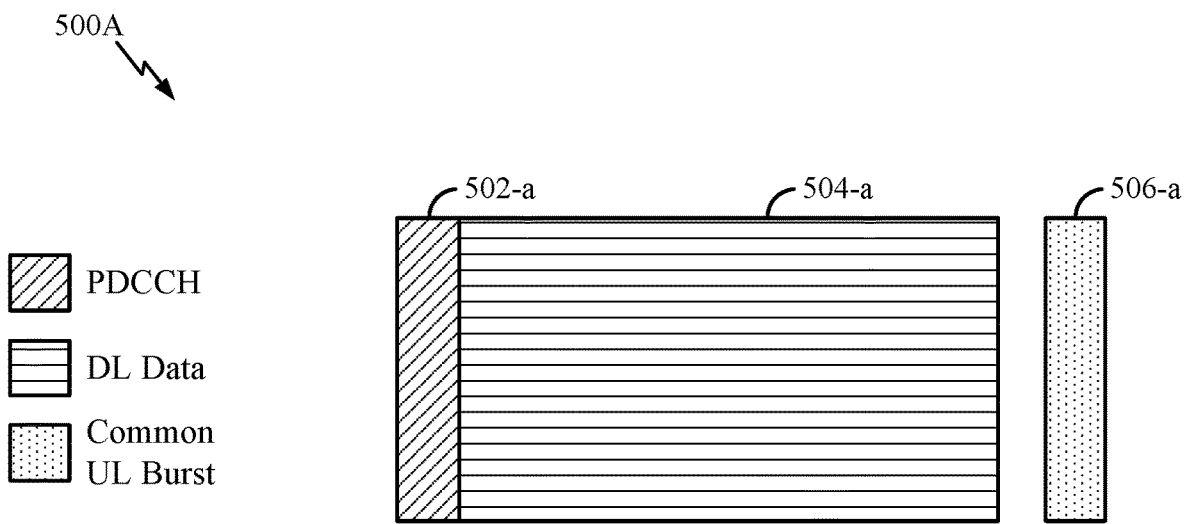
FIG. 5A illustrates an example of a downlink-centric subframe that supports multiplexing rules for handling overlapping transmissions of different communication protocols in accordance with various aspects of the present disclosure.

FIG. 5A illustrates an example of a downlink-centric subframe 500A that supports multiplexing rules for handling overlapping transmissions of different communication protocols in accordance with various aspects of the present disclosure. The downlink-centric subframe 500A may include a control portion 502-a. The control portion 502-a may exist in the initial or beginning portion of the downlink-centric subframe 500A. The control portion 502-a may include various scheduling information and/or control information corresponding to various portions of the downlink-centric subframe 500A. In some configurations, the control portion 502-a may be a PDCCH, as indicated in FIG. 5A.

The downlink-centric subframe 500A may also include a downlink data portion 504-a. The downlink data portion 504-a may sometimes be referred to as the payload of the downlink-centric subframe 500A. The downlink data portion 504-a may include the communication resources utilized to communicate downlink data from a scheduling entity 202 (e.g., eNB, base station, Node B, 5G NB, TRP, gNB, etc.) to a subordinate entity, e.g., a UE 120. In some configurations, the downlink data portion 504-a may be a PDSCH.

The downlink-centric subframe 500A may also include a common uplink portion 506-a. The common uplink portion 506-a may sometimes be referred to as an uplink burst, a common uplink burst, and/or various other suitable terms. The common uplink portion 506-a may include feedback information corresponding to various other portions of the downlink-centric subframe 500A. For example, the common uplink portion 506 may include feedback information corresponding to the control portion 502-a. Non-limiting aspects of feedback information may include an acknowledgment (ACK) signal, a negative acknowledgment (NACK) signal, a hybrid automatic repeat request (HARD) indicator, and/or various other types information. The common uplink portion 506-a may include additional or alternative information, such as information pertaining to random access channel (RACH) procedures, scheduling requests (SRs), SRSs, and various other suitable types of information.

As illustrated in FIG. 5A, the end of the downlink data portion 504-a may be separated in time from the beginning of the common uplink portion 506-a. This time separation may sometimes be referred to as a gap, a guard period (GP), a guard interval, and/or various other suitable terms. This separation provides time for the switchover from downlink communication (e.g., reception operation by the subordinate entity, e.g., UE 120) to uplink communication (e.g., transmission by the subordinate entity, e.g., UE 120). One of ordinary skill in the art will understand, however, that the foregoing is merely one aspect of a downlink-centric subframe 500A and alternative structures having similar features may exist without necessarily deviating from the aspects described herein.

In some cases, a base station 110 may transmit scheduling information to a UE 120 in a downlink-centric subframe 500A. The scheduling information may indicate a set of resources reserved for transmission by the UE 120. However, if the UE 120 has another set of resources reserved for transmission that overlaps (e.g., partially or fully) with the indicated resources, the UE 120 may perform one or more processes to handle the overlapping resources of the scheduled transmissions. The base station 110 may identify how the UE 120 handled the overlapping transmissions and may receive and decode any uplink transmissions accordingly. For example, if a URLLC transmission is scheduled to overlap with an eMBB transmission, the base station 110 may receive one or both of the transmissions based on the UE 120 multiplexing the transmissions.

Figure 5B:
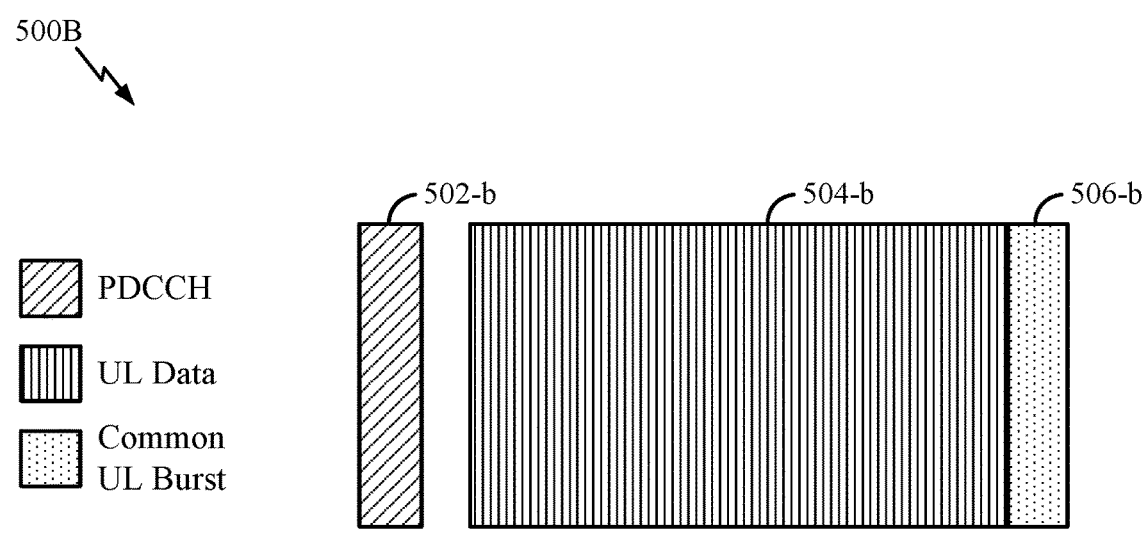
FIG. 5B illustrates an example of an uplink-centric subframe that supports multiplexing rules for handling overlapping transmissions of different communication protocols in accordance with various aspects of the present disclosure.

FIG. 5B illustrates an example of an uplink-centric subframe 500B that supports multiplexing rules for handling overlapping transmissions of different communication protocols in accordance with various aspects of the present disclosure. The uplink-centric subframe 500B may include a control portion 502-b. The control portion 502-b may exist in the initial or beginning portion of the uplink-centric subframe 500B. The control portion 502-b in FIG. 5B may be similar to the control portion 502-a described herein with reference to FIG. 5A. The uplink-centric subframe 500B may also include an uplink data portion 504-b. The uplink data portion 504-b may sometimes be referred to as the payload of the uplink-centric subframe 500B. The uplink portion may refer to the communication resources utilized to communicate uplink data from the subordinate entity (e.g., a UE 120) to the scheduling entity (e.g., a base station 110). In some configurations, the control portion 502-b may be a PUSCH. As illustrated in FIG. 5B, the end of the control portion 502-b may be separated in time from the beginning of the uplink data portion 504-b. This time separation may sometimes be referred to as a gap, GP, guard interval, and/or various other suitable terms. This separation provides time for the switchover from downlink communication (e.g., reception operation by the scheduling entity 202) to uplink communication (e.g., transmission by the scheduling entity 202).

The uplink-centric subframe 500B may also include a common uplink portion 506-b. The common uplink portion 506-b in FIG. 5B may be similar to the common uplink portion 506-a described herein with reference to FIG. 5A. The common uplink portion 506-b may additionally or alternatively include information pertaining to channel quality indicators (CQIs), SRSs, and various other types of information. One of ordinary skill in the art will understand that the foregoing is merely one aspect of an uplink-centric subframe 500B and alternative structures having similar features may exist without necessarily deviating from the aspects described herein.

As described herein, an uplink-centric subframe 500B may be used for transmitting uplink data from one or more mobile stations to a base station, and a downlink-centric subframe may be used for transmitting downlink data from the base station to the one or more mobile stations. In one aspect, a frame may include both uplink-centric subframes 500B and downlink-centric subframes 500A. In this aspect, the ratio of uplink-centric subframes 500B to downlink-centric subframes 500A in a frame may be dynamically adjusted based on the amount of uplink data and the amount of downlink data to be transmitted. For example, if there is more uplink data, then the ratio of uplink-centric subframes 500B to downlink-centric subframes 500A may be increased. Conversely, if there is more downlink data, then the ratio of uplink-centric subframes 500A to downlink-centric subframes 500B may be decreased.

In some cases, the uplink-centric subframe 500B may support multiplexing rules for handling overlapping transmissions of different communication protocols (e.g., URLLC and non-URLLC). For example, a UE 120 may identify overlapping sets of resources corresponding to different transmissions of different communication protocols. The UE 120 may process the transmissions, the resources, or both based on identifying the overlap and may transmit the processed transmissions (e.g., in an uplink data portion 504-b). In some cases, the UE 120 may drop the higher latency transmission and may just transmit the lower latency transmission. In other cases, the UE 120 may prioritize the lower latency transmission in some manner and may modify the higher latency transmission so as to not reduce the reliability or latency of the higher latency transmission.

Figure 6A:
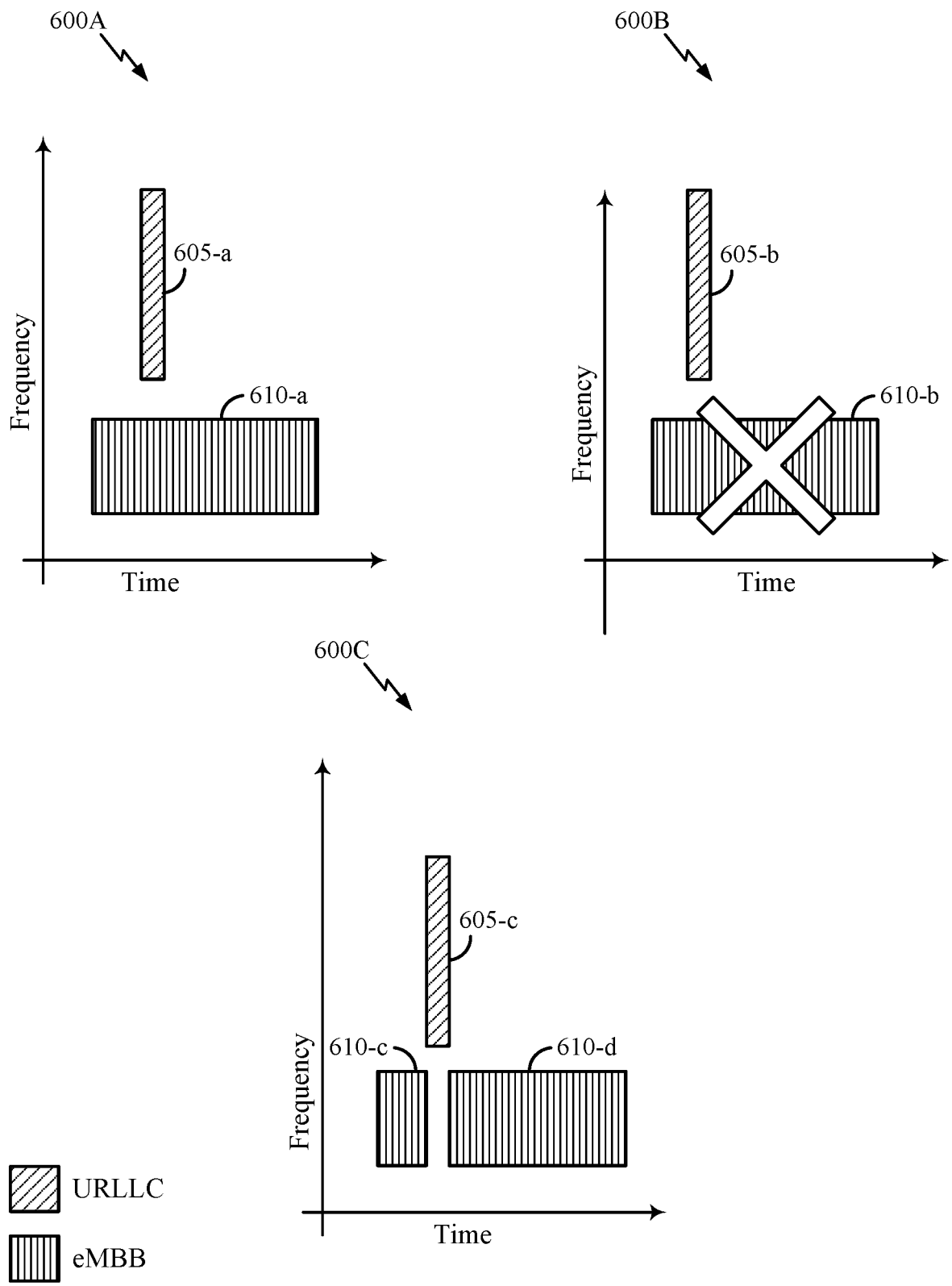
FIGS. 6A through 6C illustrate examples of resource overlap handling techniques that support multiplexing rules for handling overlapping transmissions of different communication protocols in accordance with various aspects of the present disclosure.

FIG. 6A illustrates examples of resource overlap handling techniques 600 that support multiplexing rules for handling overlapping transmissions of different communication protocols in accordance with various aspects of the present disclosure. The resource overlap handling techniques 600 may be performed by a UE 120 as described herein with reference to FIGS. 1 through 5. In some cases, a base station 110 may determine the resource overlap handling techniques 600 implemented by the UE 120 in order to successfully receive and decode the transmissions. The resource overlap handling techniques may support meeting one or more reliability and/or latency thresholds for transmission of different communication protocols (e.g., URLLC and eMBB).

In FIG. 6A, the first sets of resources 605 represents a URLLC (or another low latency communication protocol) resource. For example, a UE 120 may schedule a first transmission using a first communication protocol (e.g., a URLLC protocol) in the first set of resources 605, where the first transmission may include URLLC data such as PUSCH, or both. The second set of resources 610 represents an eMBB (or another non-URLLC or non-low latency communication protocol) resource. In some cases, a UE 120 may identify a first set of resources 605-a for a first transmission using a first communication protocol and may identify an overlap in time between the first set of resources 605-a and a second set of resources 610-a according to the resource allocation illustrated by the resource overlap handling technique 600A. The second set of resources 610-a may be for a second transmission using a second communication protocol, where the second communication protocol has a higher latency than the first communication protocol. As illustrated in FIG. 6A in some cases, the first set of resources 605-a and the second set of resources 610-a may overlap in time resources but not frequency resources.

UCI that is transmitted with uplink data on a PUSCH may be referred to as UCI piggybacked on PUSCH. In a first option, Option 1, the URLLC is not piggybacked on the non-URLLC (or slot based) PUSCH. That is, the URLLC transmission may be transmitted by a UE 120 in the URLLC resources. In a first aspect of the first option, Option 1a, the non-URLLC (or slot based) PUSCH may be completely dropped and the URLLC data may be transmitted on the URLLC resource. For example, as illustrated by the resource overlap handling technique 600B, a UE 120 may transmit the first transmission (e.g., a URLLC data transmission) in the first set of resources 605-b and may refrain from transmitting the second transmission (e.g., an eMBB data transmission) in the second set of resources 610-b based on the overlap between the sets of resources.

In a second aspect of the first option, Option 1b, a non-URLLC (or slot based) PUSCH may be rate matched (or punctured) around OFDM symbols that overlap in time with the URLLC resource. In such an aspect, the URLLC information (e.g., UCI and/or PUSCH) is transmitted on the URLLC resource in OFDM symbols for which the URLLC and the eMBB resources overlap. In some cases with puncturing (or rate matching) at a symbol level, phase continuity may be lost due to the punctured resources. For example, after resuming the transmission in the slot-based PUSCH following the punctured resources, the channel phase may be different. In some cases, more DMRS symbols may be introduced after the puncturing to address phase continuity.

As illustrated by the resource overlap handling technique 600C, in Option 1b, a LTE 120 may rate match the second transmission (e.g., the eMBB transmission) around the first set of resources 605-c for the first transmission (e.g., the URLLC transmission) based on the overlap. The LIE 120 may transmit the first transmission in the first set of resources 605-c and may transmit the second transmission in a subset of the second set of resources distinct in time from the first set of resources 605-*c* based on the rate matching. For example, after rate matching around the first set of resources 605-*c*, the second set of resources may include a second set of resources 610-*c* and a second set of resources 610-*d* for transmission of the second transmission (e.g., the eMBB transmission). In some cases, if the rate matching involves puncturing the second transmission for at least one symbol of the second set of resources with the first transmission, the UE 120 may insert a DMRS symbol into the second transmission following the first resource (e.g., in the second set of resources 610-*d*) based on puncturing the second transmission for the at least one symbol. This may provide a phase reference for the second set of resources 610-*d* in cases where the phase reference for the second set of resources prior to puncturing is located in the second set of resources 610-*c*. In a first aspect, the DMRS symbol may be inserted into a first symbol (e.g., the first OFDM symbol) of the second set of resources 610-*d* directly following the first set of resources 605-*c*. In a second aspect, the DMRS symbol may be inserted into a symbol of the second set of resources 610-*d* preceding a subsequent frequency hop of the second transmission.

Figure 6B:
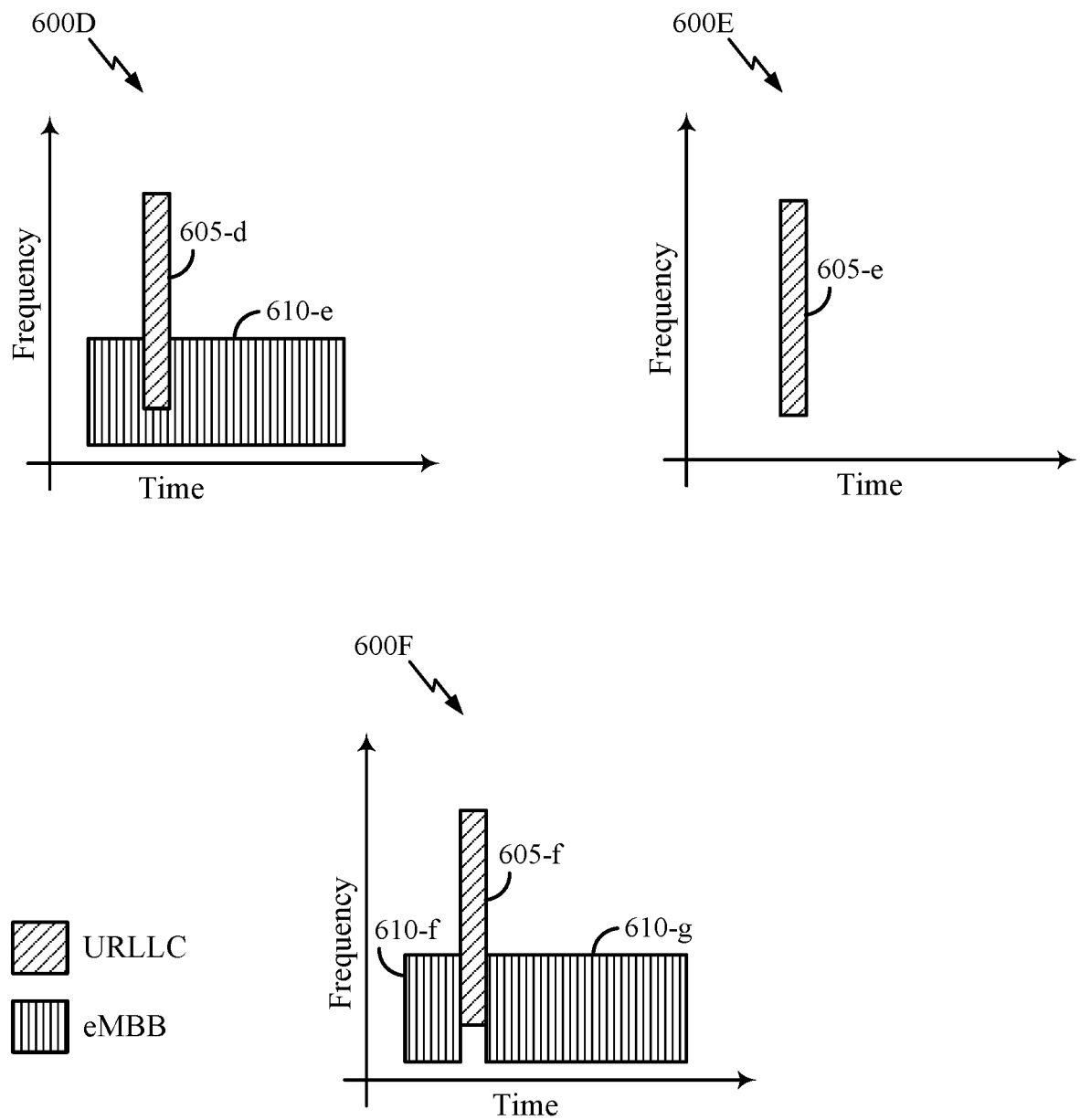

In FIG. 6B, the URLLC resources and the non-URLLC resources (e.g., eMBB resources, "normal" resources, etc.) may collide not only in time like in FIG. 6A, but also in frequency. For example, as illustrated by the resource overlap handling technique 600D, a UE 120 may identify a first set of resources 605-*d* for a first transmission using a first communication protocol and may identify an overlap in time and frequency between the first set of resources 605-*a* and a second set of resources 610-*a* for a second transmission using a second communication protocol. The first communication protocol may be associated with a lower latency than the second communication protocol. FIG. 6B may illustrate where the UE 120 transmits the first transmission in the first set of resources and modifies the second transmission or the second set of resources to support low latency and reliability for the first transmission. For example, as illustrated by the resource overlap handling technique 600E, the UE 120 may transmit the first transmission (e.g., a URLLC transmission) in the first set of resources 605-*b* and may refrain from transmitting the second transmission (e.g., an eMBB transmission). Alternatively, as illustrated by the resource overlap handling technique 600F, the UE 120 may rate match the second transmission. (e.g., the eMBB transmission) around the first set of resources 605-*f* for the first transmission (e.g., the URLLC transmission) based on the overlap. The UE 120 may transmit the first transmission in the first set of resources 605-*f* and may transmit the second transmission in a subset of the second set of resources distinct in time from the first set of resources 605-*f* based on the rate matching. For example, after rate matching around the first set of resources 605-*f*, the second set of resources may include a second set of resources 610-*f* and a second set of resources 610-*g* for transmitting the second transmission.

Figure 7:
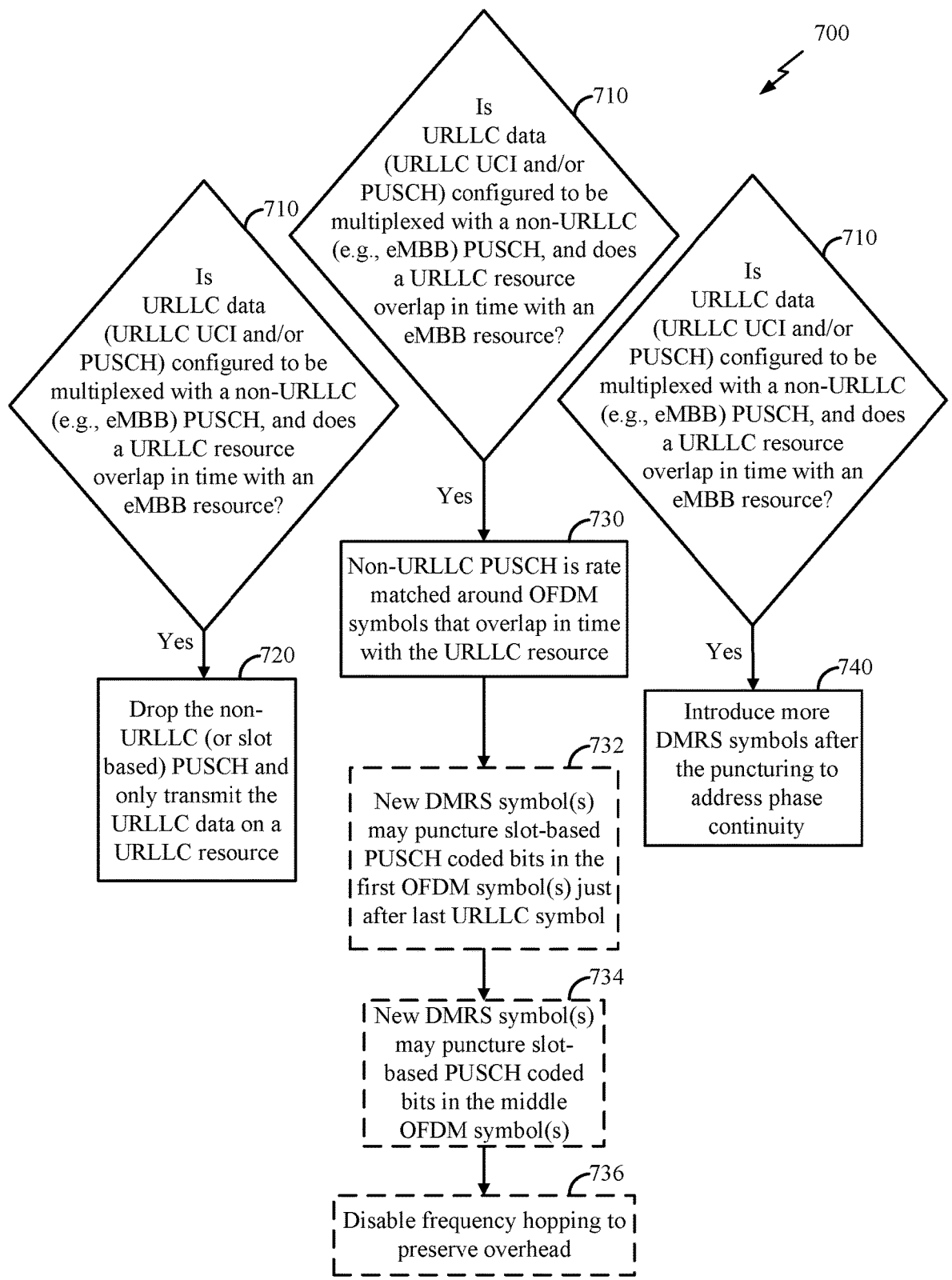
FIGS. 7 through 11 illustrate examples of process flows that support multiplexing rules for handling overlapping transmissions of different communication protocols in accordance with various aspects of the present disclosure.

FIG. 7 illustrates examples of process flows 700 that support multiplexing rules for handling overlapping transmissions of different communication protocols in accordance with various aspects of the present disclosure. The process flows 700 may be implemented by a UE 120 as described herein. In some cases, a base station 110 may implement similar or complementary processes to handle monitoring for and receiving transmissions from the UE 120. Alternative examples of the following may be implemented, where steps may be performed in a different order than described or are not performed at all. In some cases, steps may include additional features not mentioned below, or further steps may be added.

At 710 of FIG. 7, URLLC data and non-URLLC (or slot-based) data can be multiplexed when a URLLC resource overlaps (either partially or completely) with a non-URLLC PUSCH. In a first aspect, at 720, the UE 120 may drop the non-URLLC (or slot-based) PUSCH and only transmit the URLLC data on the URLLC resource.

In a second aspect, at 730, the UE 120 may rate match the non-URLLC PUSCH around any time resources e.g., OFDM symbols) that overlap in time with the URLLC resource.

In a first case (Alt 1) for rate matching slot-based PUSCH around OFDM symbols that overlap in time with the URLLC resource, at 732, new DMRS symbol(s) may puncture slot-based PUSCH coded bits in the first OFDM symbol(s) which are directly after the last URLLC symbol. The UE 120 may introduce these DMRS symbols to support phase references in different segments of the punctured eMBB PUSCH.

In a second case (Alt 2) for rate matching slot-based PUSCH around OFDM symbols that overlap in time with the URLLC resource, at 734, new DMRS symbol(s) may puncture slot-based PUSCH coded bits in the middle OFDM symbol(s) between the last URLLC symbol and the end of slot-based PUSCH symbols in the current hop (e.g., in the same set of frequency hopped resources prior to hopping to a different set of frequency hopped resources).

In a third case (Alt 3) for rate matching slot-based PUSCH around OFDM symbols that overlap in time with the URLLC resource, if frequency hopping is initially enabled, at 736 the UE 120 may disable frequency hopping. Disabling frequency hopping may preserve overhead by extra DMRS because DMRS symbols initially introduced for the second hop (e.g., a second set of frequency hopped resources following a frequency hop) may instead be used in the first hop (e.g., the first set of frequency hopped resources prior to the frequency hop) for all slot-based PUSCH, e.g., from the last URLLC symbol to the end of the PUSCH symbols.

Alt 1, Alt 2, and Alt 3 may be used in any combination for UE 120 to introduce more DMRS symbols after puncturing the eMBB transmission at the symbol level to address (e.g., maintain) phase continuity (e.g., at 740).

In a third aspect of the first option, Option 1c, a UE 120 may operate in a similar manner to the second aspect of the first option, Option 1b, unless simultaneous transmission of URLLC and eMBB PUSCH is supported (e.g., enabled) at the UE 120. For REs in which the URLLC and the eMBB resources overlap, the PUSCH may be rate matched (or punctured). For example, if the URLLC data is UCI, and is carried by the PUCCH, Option 1c supports simultaneous transmission of PUCCH and PUSCH. However, the UE 120 may use more power to transmit the URLLC data as the URLLC data may have a higher reliability requirement. For cases where there is no overlap between URLLC and eMBB resources, the power constraint for power allocated to URLLC and eMBB can be described by the following formula:

$$\text{Max\_pwr}-\text{URLLC\_pwr}-\text{eMBB\_pwr} > \Delta, \tag{1}$$

where $\Delta$ represents a design margin, URLLC_pwr represents power allocated to the URLLC transmission and eMBB_pwr represents power allocated to the eMBB transmission. In some cases, the simultaneous transmission of PUCCH and PUSCH may be deprioritized for some wireless communications systems.

With simultaneous transmission between URLLC and eMBB, the URLLC may receive more power than the eMBB to support the reliability thresholds defined for URLLC transmissions. In some cases, the URLLC and eMBB transmissions may have different timelines. For example, when the URLLC information (UCI and/or PUSCH) is generated, a slot-based PUSCH may have been previously prepared. In such an example, rate matching the slot-based PUSCH around the URLLC resource may be difficult, especially if part of the slot-based PUSCH is already transmitted. In these cases, the UE 120 may perform puncturing instead to avoid transmitting in the URLLC resource.

Rate matching and puncturing may be two types of processing supported for transmissions. One difference between puncturing and rate matching is with rate matching, an encoder (e.g., at a UE 120) may identify which REs are not used for mapping the coded bits, while with puncturing the encoder may not make this identification. Instead, when an encoder encodes and obtains the coded bits for puncturing, the encoder may assume that punctured REs will be transmitted with the rest of the transmission. However, when the UE 120 performs the actual mapping of the REs, the coded bits corresponding to non-used REs will be punctured/dropped. If URLLC data (e.g., UCI or/and PUSCH) collides with eMBB DMRS symbols, DMRS symbols will be impacted by the puncturing. In some cases, similar to Option 1b, the UE 120 may introduce DMRS symbols after the puncturing to address phase continuity.

Another problem may occur if URLLC data collides with eMBB UCI, for example eMBB HARQ-ACK. In a first aspect, a UE 120 may use eMBB UCI (e.g., all types or some type of eMBB UCI, such as only HARQ-ACK) to puncture eMBB data after a URLLC symbol. Other types of eMBB UCI (e.g., including CSI part 1, CSI part 2, etc.) may be dropped. In a second aspect, the UE 120 may use eMBB UCI (e.g., all types or some type of eMBB UCI, such as only HARQ-ACK) to rate match eMBB data after a URLLC symbol. To support this rate matching, the timeline may allow for re-rate matching of eMBB UCI and data. In both aspects, those types of eMBB UCI that are not puncturing and/or rate-matching data after the URLLC symbol may be lost (e.g., dropped or otherwise not transmitted).

In some systems, URLLC data and non-URLLC (e.g., eMBB, slot-based, etc.) data can be multiplexed using piggy-backing. For example, if a UE 120 is able to perform URLLC UCI multiplexing with eMBB (i.e., non-URLLC) PUSCH, then URLLC UCI may be made available in the first OFDM symbol(s) of a long eMBB PUSCH. Long eMBB PUSCH may contain, for example, ten OFDM symbols.

Some wireless communication systems (e.g., NR systems) support frequency hopping for PUSCH. This frequency hopping may enhance reliability of transmissions. Once frequency hopping is enabled, the coded bits for each UCI type (e.g., HARQ-ACK and CSI) may be divided into two parts, part 1 and part 2. The coded bits for each UCI type may be mapped to the first OFDM symbols within each hop (e.g., within each set of frequency hopped resources). A base station 110 may wait longer to receive the URLLC UCI, as a portion of the URLLC UCI may be mapped to the first symbols of a last hop in a series of frequency hops. For example, if the URLLC UCI is initially configured with PUCCH format 0 with one OFDM symbol, after URLLC UCI is piggybacked on the eMBB PUSCH with hopping (e.g., with five symbols in each of two set of frequency hopped resources), the base station 110 may wait five more symbols to decode the whole URLLC UCI due to the extra hop. This may result in additional latency in the communications, which may negatively affect the performance of URLLC. As such, a UE 120 may insert the UCI on the first hop of a set of hops, rather than on each of hop of the set of hops, to support lower latency for the URLLC transmissions.

Figure 6C:
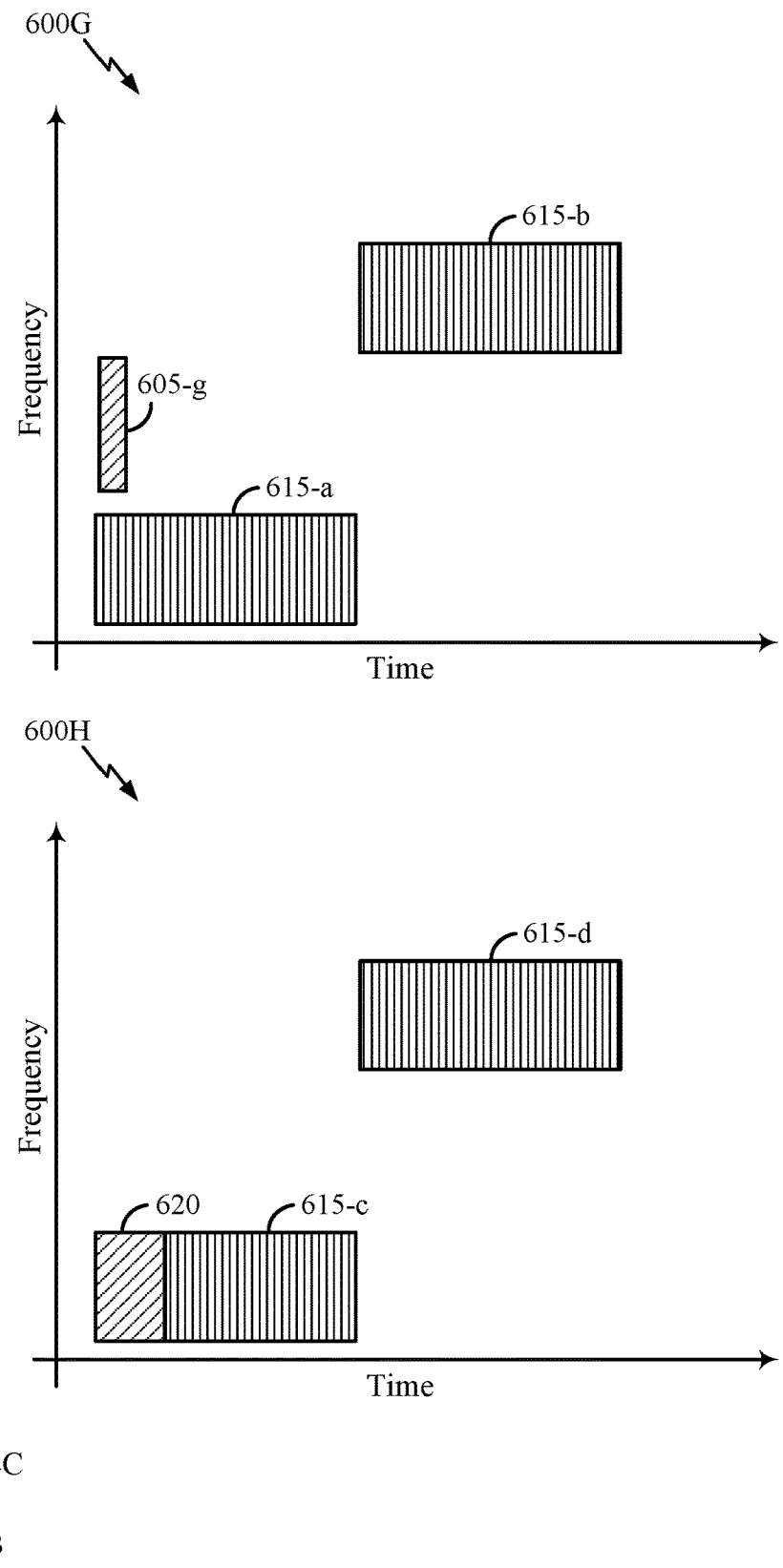

In FIG. 6C, an example of frequency hopping is shown where the eMBB PUSCH hops from a first hop frequency to a second hop frequency. That is, as shown in the resource overlap handling technique 600G, a UE 120 may identify a first set of resources 605-*g* for a first transmission using a first communication protocol and may identify an overlap in time and frequency between the first set of resources 605-*g* and a second set of resources for a second transmission using a second communication protocol. The second set of resources may include a frequency hop from a first set of frequency hopped resources 615-*a* to a second set of frequency hopped resources 615-*b*. Each set of frequency hopped resources 615 may span a different set of resource blocks (RBs) in the frequency domain.

A UE 120 may perform multiplexing based on the overlap between the first set of resources 605-*g* and the second set of resources (e.g., the first set of frequency hopped resources 615-*a*). After multiplexing, as illustrated in the resource overlap handling technique 600H, the URLLC UCI may be mapped to the first OFDM symbol(s) 620 of the eMBB PUSCH at the first hop (e.g., in the first set of frequency hopped resources 615-*c*). For example, by piggybacking the URLLC UCI on just the first set of frequency hopped resources 615-*c*, and not additionally in the second set of frequency hopped resources 615-*d* following the hop, the UE 120 may provide all of the URLLC UCI to a base station 110 in a lower latency transmission (i.e., the base station 110 may not wait to receive on the second set of frequency hopped resources 615-*d* in order to receive and decode the URLLC UCI).

Including URLLC UCI in each set of frequency hopped resources may add reliability to transmitting the URLLC UCI using frequency hopping. However, for slot-based PUSCH, where each hop may contain a couple of symbols, the added reliability may impact the latency of the URLLC UCI. In some cases, this added reliability may have little to no effect, e.g., if UCI includes only HARQ-ACK with a few information bits (e.g., two bits). To counteract this latency impact, the UE 120 may include the URLLC UCI in the first hop, and not in subsequent hops of the slot-based PUSCH.

Figure 8:
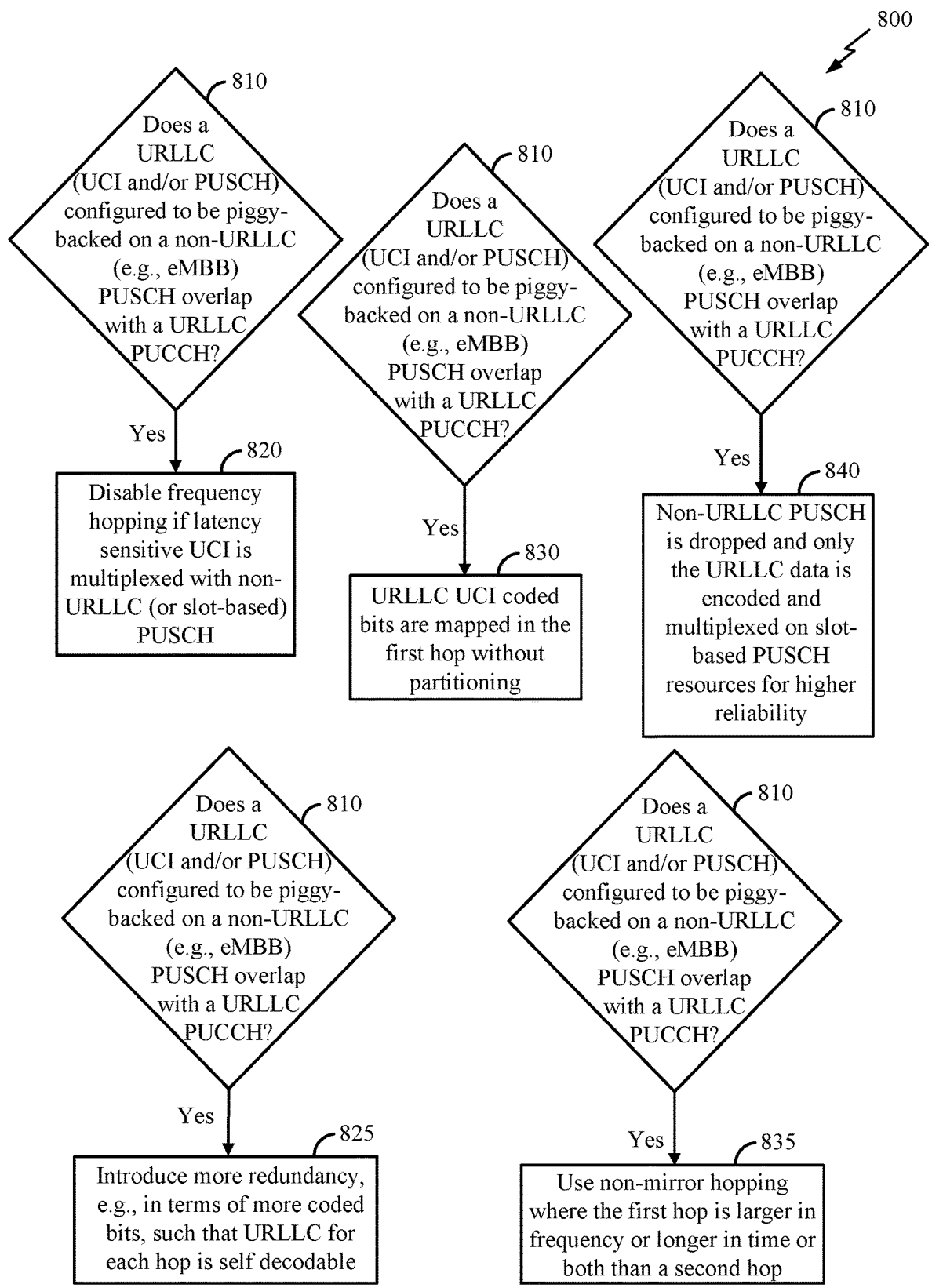

FIG. 8 illustrates examples of process flows 800 that support multiplexing rules for handling overlapping transmissions of different communication protocols in accordance with various aspects of the present disclosure. The process flows 800 may be implemented by a UE 120 as described herein. In some cases, a base station 110 may implement similar or complementary processes to handle monitoring for and receiving transmissions from the UE 120. Alternative aspects of the following may be implemented, where steps may be performed in a different order than described or are not performed at all. In some cases, steps may include additional features not mentioned below, or further steps may be added.

As stated above, if a URLLC UCI and/or PUSCH is to be piggybacked on a non-URLLC (e.g., eMBB) PUSCH resource, and the non-URLLC PUSCH overlaps (e.g., either partially or completely) with a URLLC PUCCH (e.g., at 810 of FIG. 8), then a UE 120 may perform one or more processes for handling the overlapping resources.

In a second option, Option 2 at 820, the UE 120 may disable frequency hopping if latency sensitive (e.g., URLLC) UCI is multiplexed with non-URLLC (or slot-based) PUSCH. In some cases, disabling frequency hopping may incur a tradeoff between improving latency and sacrificing reliability (from frequency hopping diversity), where the reliability may be beneficial for PUSCH transmissions. Additionally or alternatively, disabling frequency hopping for a long PUSCH may result in the second half of a UE's long PUSCH interfering with another UE's PUSCH which was scheduled to be at the same time/frequency location. The UE 120 or base station 110 may identify this interference and may perform one or more operations to mitigate the interference or modify one of the transmissions.

In a third option, Option 3 at 825, the UE 120 may introduce more redundancy (e.g., in terms of additional coded bits) such that URLLC information for each hop is self-decodable. For example, for multiple sets of frequency hopped resources, the UE 120 may include redundant URLLC UCI coded bits in each of the sets of frequency hopped resources such that the URLLC for each set of frequency hopped resources may be decoded using the UCI in that set of frequency hopped resources. As such, the URLLC information is mapped to both hops when a slot-based PUSCH includes two sets of frequency hopped resources, but the base station 110 may be able to decode the URLLC UCI within the first hop. In some cases, based on these redundant coded bits, fewer REs may be available for transmission of the non-URLLC PUSCH.

In a fourth option, Option 4 at 830, the UE 120 may map the URLLC UCI coded bits in the first hop (e.g., the first set of frequency hopped resources) without partitioning the URLLC UCI into two parts for two different hop frequencies (or multiple parts for multiple different frequencies). Coded bits for URLLC information may be mapped to the first hop without partitioning. URLLC coded bits can contain URLLC PUSCH and/or UCI. As illustrated in FIG. 6C, the URLLC UCI may be mapped on the non-URLLC PUSCH only in the first hop. The URLLC is piggybacked in this first hop (e.g., this first set of frequency hopped resources) with the eMBB PUSCH. Although piggybacking of URLLC UCI on an eMBB PUSCH is described herein, it is to be understood that the URLLC data can be PUSCH, UCI, or both.

Although Option 4 improves the transmission latency for latency-dependent information, Option 4 additionally results in non-mirrored hops which have different numbers of REs for eMBB PUSCH in each set of frequency hopped resources. "Non-mirrored" may imply that with URLLC UCI mapped onto the first hop, the number of available REs for the non-URLLC PUSCH is not the same in the first and second hops (e.g., in each set of frequency hopped resources. In a first aspect (Alt1), only some URLLC UCI types (e.g., the HARQ-ACK coded bits) are mapped into the first hop without partitioning. In some cases, URLLC HARQ-ACK coded bits are mapped into the first hop without partitioning if the number of HARQ-ACK information bits is no more than two bits. In a second aspect (Alt2), at 835, non-mirrored hopping may be implemented by the UE 120, where the first hop is larger in frequency, or longer in time, or both than the second hop. How much larger may depend on the number of REs that are used/reserved for URLLC in the first hop.

As described herein, if a URLLC (e.g., UCI or/and PUSCH) is configured to be piggy-backed on a non-URLLC (e.g., eMBB) PUSCH, a UE 120 may perform one or more processes to handle this multiplexing. In one option, Option 5 at 840, the UE 120 may drop (e.g., refrain from transmitting) the non-URLLC PUSCHs. Instead, the UE 120 may encode the URLLC data (e.g., UCI or/and PUSCH) and multiplex this encoded data on slot-based PUSCH resources (e.g., long PUSCH resources) for improved reliability of the URLLC transmission.

Figure 9:
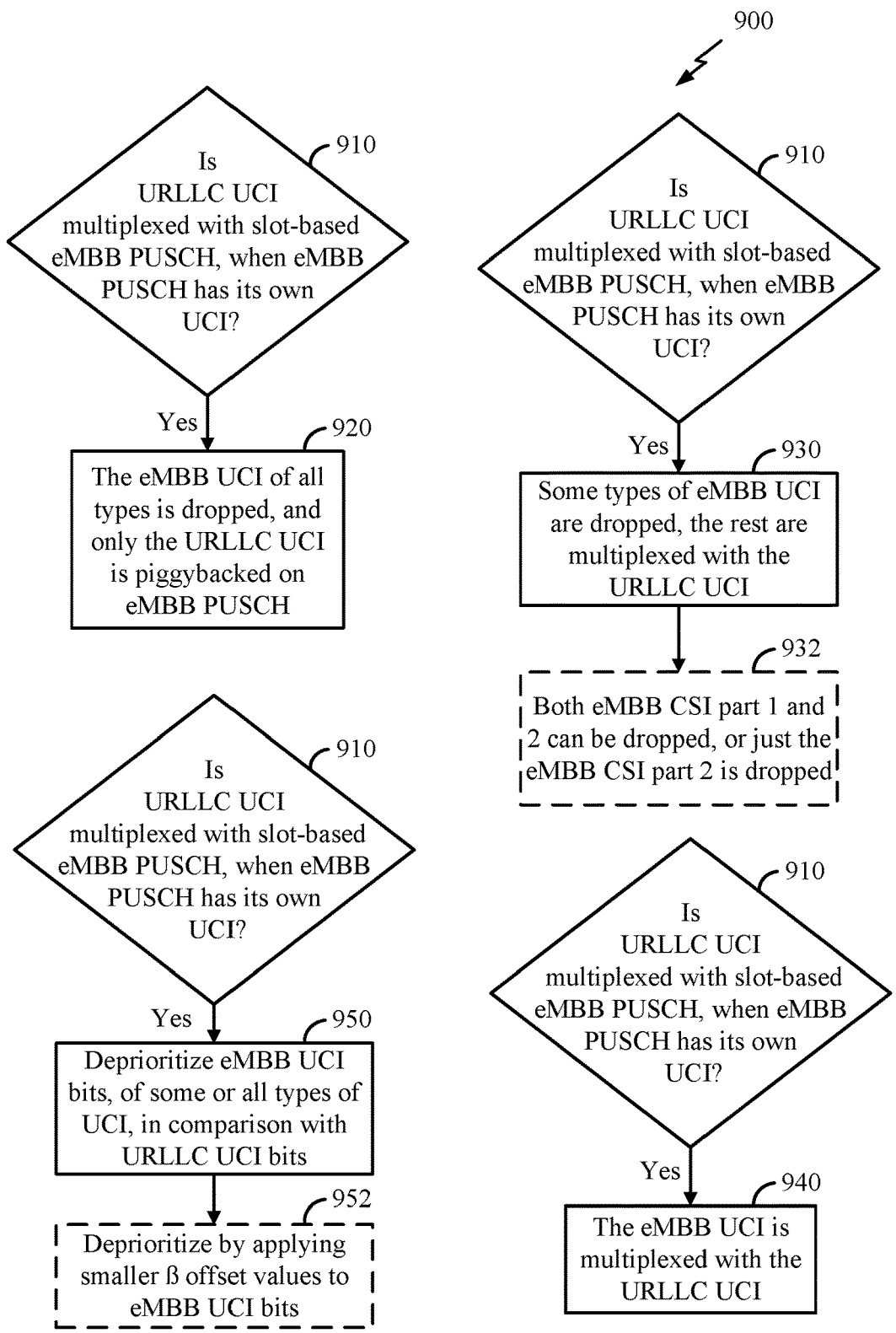

FIG. 9 illustrates examples of process flows 900 that support multiplexing rules for handling overlapping transmissions of different communication protocols in accordance with various aspects of the present disclosure. The process flows 900 may be implemented by a UE 120 as described herein. In some cases, a base station 110 may implement similar or complementary processes to handle monitoring for and receiving transmissions from the UE 120. Alternative aspects of the following may be implemented, where steps may be performed in a different order than described or are not performed at all. In some cases, steps may include additional features not mentioned below, or further steps may be added.

If a PUSCH is scheduled for a UE 120 in a subframe in which the UE 120 transmits UCI (e.g.; CSI. ACK/NACK, etc.), the UCI may be multiplexed with the PUSCH. In a first aspect, the UE 120 may multiplex URLLC UCI and eMBB PUSCH when the eMBB has its own UCI.

At 910, the UE 120 may multiplex URLLC UCI with a slot-based eMBB PUSCH, where the eMBB PUSCH has its own UCI. In these cases, the UE 120 may perform one or more processes to handle this multiplexing. Here there are two types of UCI transmitted by the UE 120, URLLC UCI and eMBB (or non-URLLC) UCI.

In a first aspect (Alt1) at 920, the UE 120 may drop (e.g., refrain from transmitting) eMBB UCI of all types. In this aspect, the UE 120 may transmit the URLLC UCI piggy-backed on the eMBB PUSCH. In a second aspect (Alt2) at 930, the UE 120 may drop (e.g., refrain from transmitting) a subset of the eMBB UCI (e.g., some specific types of eMBB UCI). The UE 120 may multiplex the rest of the eMBB UCI with the URLLC UCI. For example, at 932, the UE 120 may refrain from transmitting both eMBB CSI part 1 and part 2, or alternatively the UE 120 may drop the eMBB CSI part 2. The other portions of the CSI UCI may be transmitted based on the multiplexing. For those eMBB UCI types that are multiplexed with URLLC UCI, multiplexing can be done, for example, by appending the eMBB UCI bits into the URLLC UCI bits (payload) and perform joint encoding on the effective payload. Additionally or alternatively, the UE 120 may perform rate-matching on the eMBB UCI after mapping the URLLC UCI to the transmission resources. In a third aspect (Alt3) at 940, the UE 120 may multiplex the eMBB UCI with the URLLC UCI. If the number of REs is not enough to handle all of the eMBB and URLLC UCI, eMBB PUSCH data can be dropped to make room for UCI coded bits.

In some cases, at 950 once the eMBB UCI is multiplexed with the URLLC UCI, the UE 120 may deprioritize the eMBB UCI bits in comparison to the URLLC UCI bits (e.g., for some or all types). De-prioritization can be done, at 952 for example, by applying smaller $\beta_{offset}$ values to eMBB UCI bits than to URLLC UCI bits. Additionally or alternatively, all or some types of the eMBB UCI can be treated as CSI part 2 when mapped to REs.

In some systems, a wireless device (e.g., a base station 110, a UE 120, etc.) may indicate to a UE 120 if URLLC data cannot be multiplexed with eMBB PUSCH (e.g., whether this multiplexing is not supported, is not enabled, etc.). In some cases, whether URLLC data (e.g., UCI and/or PUSCH) can or cannot be multiplexed with a slot-based PUSCH may be implicitly indicated to the UE 120. In other cases, whether URLLC data can be multiplexed with a first set of frequency hopped resources for a slot-based PUSCH with frequency hopping enabled may be indicated. In some aspects, this information may be implicitly indicated one of four ways. First, this implicit indication may be based on if the URLLC data corresponds to URLLC downlink information. For example, if the URLLC data includes HARQ ACK corresponding to mini-slot-based PDSCH, if the URLLC data includes a CQI BLER target that is associated with URLLC (e.g., $10^{-5}$ or $10^{-4}$), etc. Second, the implicit indication may be based on a length of a PUCCH resource. For example, if a PUCCH resource that is initially assigned to carry UCI is a short PUCCH, then the UCI may be latency sensitive. Third, if a HARQ ACK corresponds to downlink retransmission, then the HARQ ACK/NACK is latency sensitive and is a URLLC type UCI. Fourth, the implicit indication of whether the HARQ ACK is latency sensitive may be based on a timeline of eMBB and URLLC grant indications, grant durations, DMRS locations/density, URLLC and/or eMBB rank, or some combination of these. In some cases, if at the time of eMBB transmission the URLLC is not ready yet, piggybacking may not be possible and Option 1 may be implemented. Depending on the UE's transmit power, the rank of the eMBB, and/or the number of DMRS after being punctured by URLLC, a UE 120 may implicitly determine whether to completely drop eMBB (e.g., Option 1a) or operate according to Option 1b or Option 1c.

In some cases, some or all of this information may be indicated explicitly to the UE 120. For example, a DCI field may be added to the DCI which can indicate whether UCI is to be mapped to just the first hop in a frequency hopping sequence. Additionally or alternatively, an explicit indication may be based on, e.g., a timeline of URLLC and eMBB grant indications. For example if the timeline allows piggybacking, then the DCI field may indicate whether UCI may be mapped to the first hop. If the timeline does not allow piggybacking, the UE 120 may interpret and indicate an option for handling the processing based on the DCI field.

Figure 10:
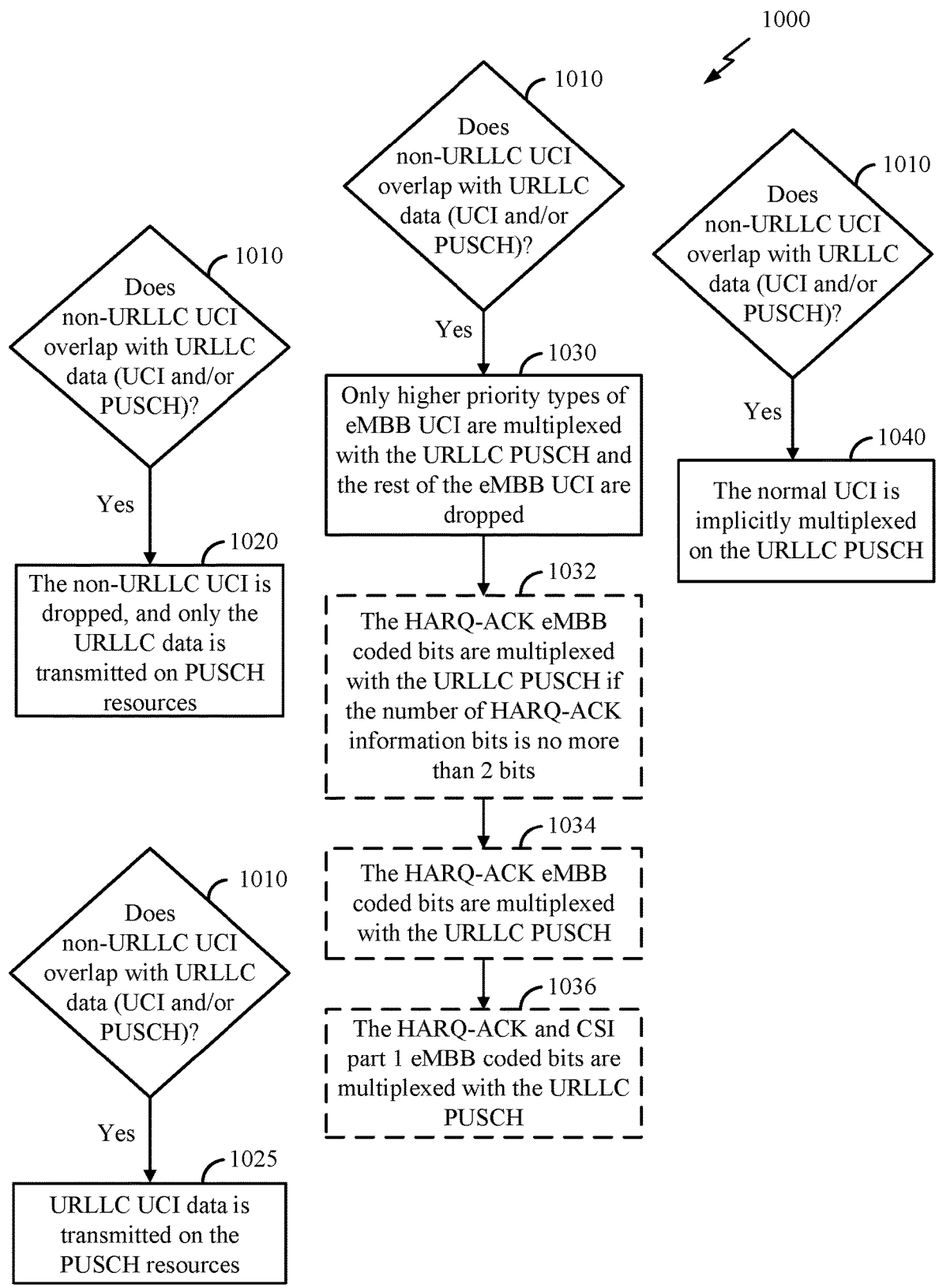

FIG. 10 illustrates examples of process flows 1000 that support multiplexing rules for handling overlapping transmissions of different communication protocols in accordance with various aspects of the present disclosure. The process flows 1000 may be implemented by a UE 120 as described herein. In some cases, a base station 110 may implement similar or complementary processes to handle monitoring for and receiving transmissions from the UE 120. The process flows 1000 may correspond to a second case, where the UE 120 may multiplex eMBB UCI and URLLC data. Alternative aspects of the following may be implemented, where steps may be performed in a different order than described or are not performed at all. In some cases, steps may include additional features not mentioned below, or further steps may be added.

In some cases (e.g., "Case 2" at 1010), a UE 120 may multiplex normal eMBB or non-URRLC) UCI and URLLC data (e.g., URLLC UCI and/or URLLC PUSCH). If a non-URLLC UCI overlaps with URLLC data (e.g., UCI and or PUSCH), a number of options can be taken to perform the multiplexing.

In a first option, Option 1, there may be no piggybacking of the eMBB or normal UCI on the URLLC PUSCH. At 1020, the non-URLLC (or normal) UCI is dropped (e.g., not transmitted) and only the URLLC data is transmitted on PUSCH resources. This may occur when, for example, a PUSCH retransmission overlaps with a PUCCH transmission.

In another aspect, Option 1-1 at 1025, if the PUCCH is a long PUCCH that provides more coding gain than an eMBB PUCCH, the UE 120 may transmit uplink URLLC data on a PUCCH resource. This may occur, for example, if the PUCCH is allocated by a downlink grant while the URLLC UE 120 uses uplink grant-free transmissions for the PUSCH. The long PUCCH can be PUCCH format 1/3/4 with a length of 4-14 OFDM symbols.

In still another option, Option 2 at 1030, some high priority types of eMBB UCI (e.g., a subset of the total eMBB UCI) may be multiplexed with the URLLC PUSCH and the rest of the eMBB UCI may be dropped. For example, CSI part 1 can be higher priority than CSI part 2.

In some cases (e.g., in Option 2-1 at 1032), a UE 120 may multiplex the HARQ-ACK coded bits with URLLC PUSCH if the number of HARQ-ACK information bits is no more than two bits. In other cases (e.g., in Option 2-2 at 1034), the UE 120 may always multiplex the HARQ-ACK coded bits with the URLLC PUSCH. In yet other cases (e.g., in Option 2-3 at 1036), the UE 120 may multiplex the HARQ-ACK coded bits and CSI part 1 with the URLLC PUSCH.

In a third option, Option 3 at 1040, the UE 120 may implicitly multiplex the eMBB UCI on the URLLC PUSCH. For example, in Option 3-1, the normal UCI is multiplexed on the URLLC PUSCH through resource selection. In this aspect, four resources may be defined for the URLLC PUSCH and the base station 110 may blind decode all four resources. In some cases, only a few UCI bits can be indicated using this approach (e.g., the resources used may indicate the HARQ-ACK with up to two bits). In another aspect, in Option 3-2, the normal UCI can be multiplexed with a PUSCH DMRS. Similarly, in some cases, just a few UCI bits can be multiplexed using this approach.

Figure 11:
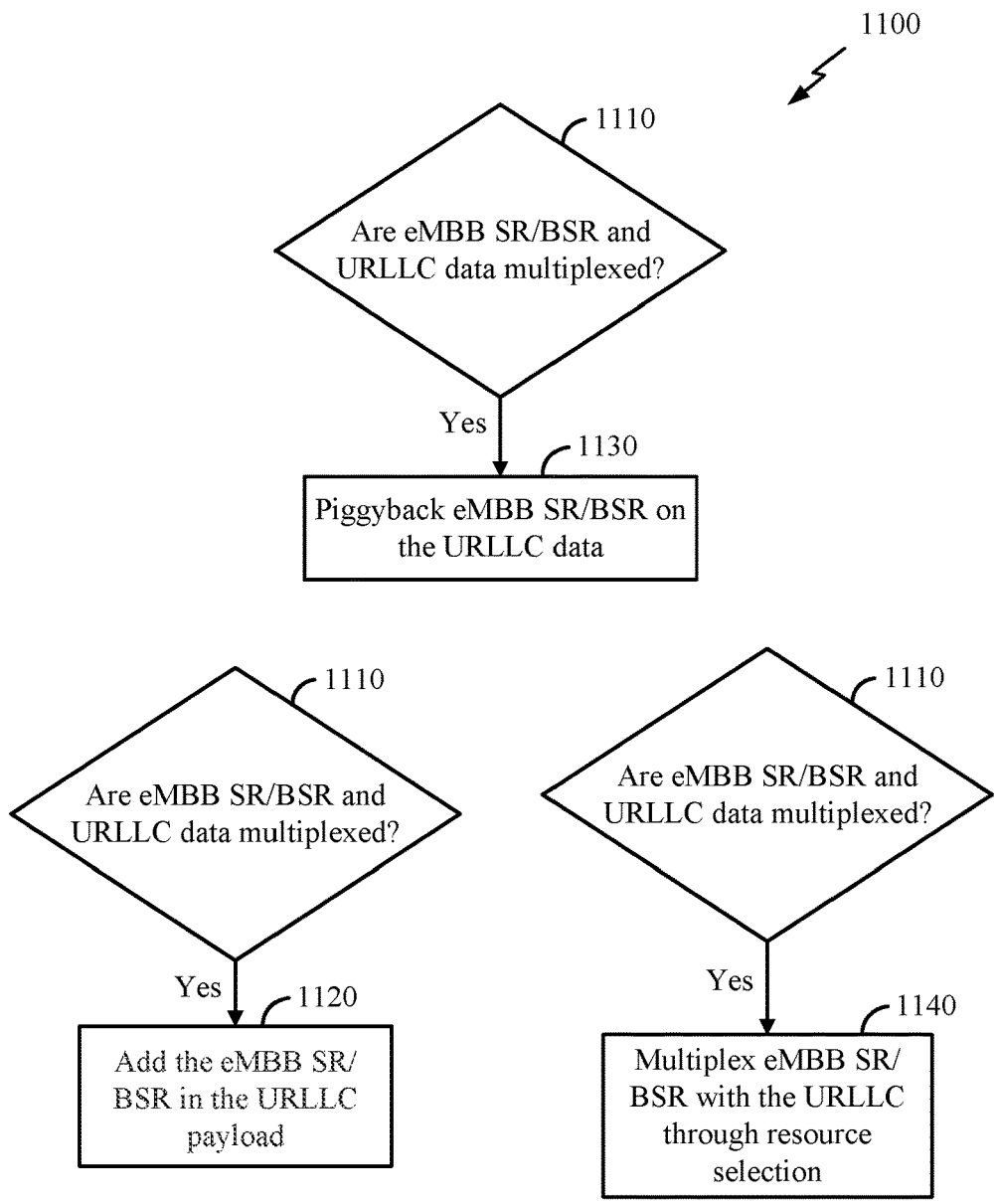

FIG. 11 illustrates examples of process flows 1100 that support multiplexing rules for handling overlapping transmissions of different communication protocols in accordance with various aspects of the present disclosure. The process flows 1100 may be implemented by a UE 120 as described herein. In some cases, a base station 110 may implement similar or complementary processes to handle monitoring for and receiving transmissions from the UE 120. The process flows 1100 may correspond to a third case, where the UE 120 may multiplex an eMBB SR/buffer status report (BSR) and URLLC data. Alternative aspects of the following may be implemented, where steps may be performed in a different order than described or are not performed at all. In some cases, steps may include additional features not mentioned below, or further steps may be added.

In some cases, at 1110, a UE 120 may multiplex eMBB SR/BSR and URLLC data. In a first option, at 1120, the UE 120 may add the eMBB SR/BSR into the URLLC payload. In this option, the UE 120 may jointly encode the eMBB SR/BSR and the URLLC payload into a single codeword. In a second option, at 1130, the UE 120 may piggyback the eMBB SR/BSR on the URLLC data. In a third option, at 1140, the UE 120 may implicitly indicate the eMBB SR/BSR through resource selection. For example, URLLC may be configured with two resources, where the SR is indicated by the resource selection for the URLLC transmission.

The options as described herein may correspond to different functions or processes that may be performed by a UE 120, a base station 110, or both for handling overlapping transmissions of different communication protocols. A wireless device may perform any combination of these options for handling the overlapping transmissions. Furthermore, as used herein, "URLLC" may correspond to any communication protocol with a short latency threshold, and "eMBB" may correspond to any communication protocol with a latency threshold longer than the URLLC latency threshold.

Figure 12:
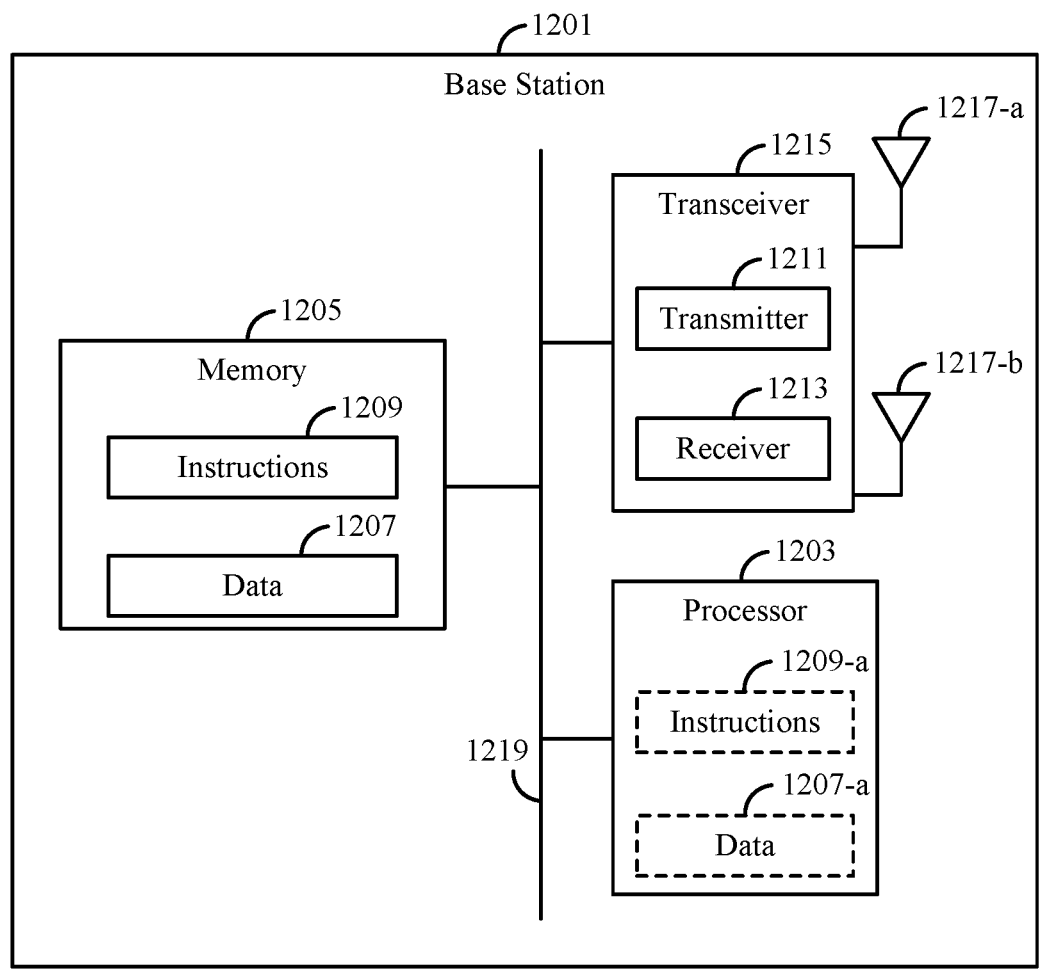
FIG. 12 illustrates a system including a base station that supports multiplexing rules for handling overlapping transmissions of different communication protocols in accordance with various aspects of the present disclosure.

FIG. 12 illustrates a system including a base station 1201 that supports multiplexing rules for handling overlapping transmissions of different communication protocols in accordance with various aspects of the present disclosure. The base station 1201 may be an access point, a NodeB, an evolved NodeB, etc. The base station 1201 may include a processor 1203. The processor 1203 may be a general purpose single-chip or multi-chip microprocessor (e.g., an advanced reduced instruction set computer (RISC) architecture (ARM)), a special purpose microprocessor (e.g., a digital signal processor (DSP)), a microcontroller, a programmable gate array, etc. The processor 1203 may be referred to as a central processing unit (CPU). Although just a single processor 1203 is shown in the base station 1201 of FIG. 12, in an alternative configuration, a combination of processors (e.g., an ARM and DSP) may be used.

The base station 1201 may also include memory 1205. The memory 1205 may be any electronic component capable of storing electronic information. The memory 1205 may be embodied as random-access memory (RAM), read-only memory (ROM), magnetic disk storage media, optical storage media, flash memory devices in RAM, on-board memory included with the processor, erasable programmable read-only memory (EPROM), electronically erasable programmable read-only memory (EEPROM), registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209-*a* may be loaded onto the processor 1203, and various pieces of data 1207-*a* may be loaded onto the processor 1203.

The base station 1201 may also include a transmitter 1211 and a receiver 1213 to allow transmission and reception of signals to and from the wireless device 1201. The transmitter 1211 and receiver 1213 may be collectively referred to as a transceiver 1615. Multiple antennas, such as antennas 1217-*a* and 1217-*b*, may be electrically coupled with the transceiver 1215. The base station 1201 may also include (not shown) multiple transmitters, multiple receivers and/or multiple transceivers.

The various components of the base station 1201 may be coupled together by one or more buses, which may include a power bus, a control signal bus, a status signal bus, a data bus, etc. For the sake of clarity, the various buses are illustrated in FIG. 12 as a bus system 1219. Although some operations or functions described herein were discussed with reference to a UE, it should be understood that a base station, such as base station 1201, may perform the corresponding transmitting that is received and monitored by the UE as well as the receiving of the information indicated by the UE described herein and may be implemented in hardware, software executed by a processor like the processor 1203 described in FIG. 12, or both. Some or all of the functions described herein in the flowcharts of FIGS. 7-11 may be implemented in hardware, software executed by a processor like the processor 1203 described in FIG. 12, or a combination thereof by a base station 1201.

Figure 13:
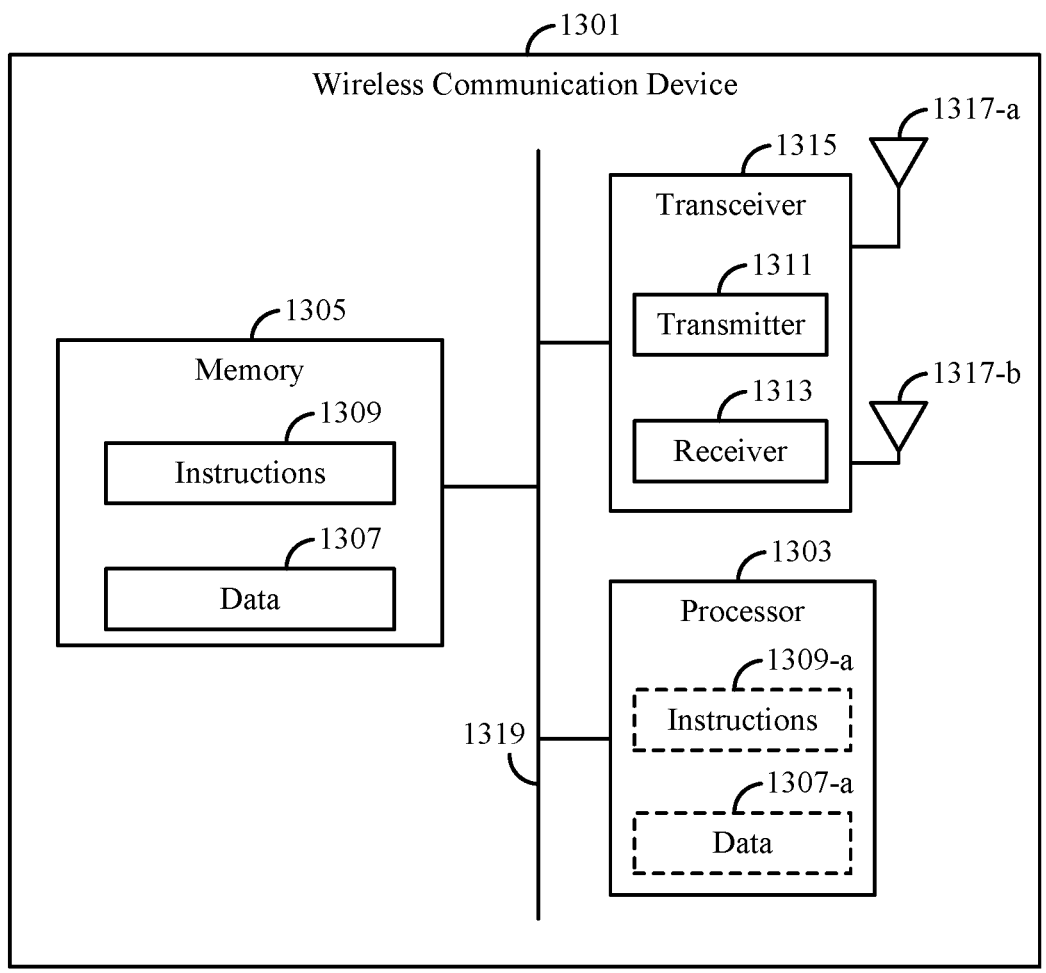
FIG. 13 illustrates a system including a wireless communication device that supports multiplexing rules for handling overlapping transmissions of different communication protocols in accordance with various aspects of the present disclosure.

FIG. 13 illustrates a system including a wireless communication device 1301 (e.g., a UE 120) that supports multiplexing rules for handling overlapping transmissions of different communication protocols in accordance with various aspects of the present disclosure. The wireless communication device 1301 may be an access terminal, a mobile station, a UE, etc. The wireless communication device 1301 includes a processor 1303. The processor 1303 may be a general-purpose single-chip or multi-chip microprocessor (e.g., an ARM), a special purpose microprocessor (e.g., a DSP), a microcontroller, a programmable gate array, etc. The processor 1303 may be referred to as a CPU. Although just a single processor 1303 is shown in the wireless communication device 1301 of FIG. 13, in an alternative configuration, a combination of processors (e.g., an ARM and DSP) may be used.

The wireless communication device 1301 also includes memory 1305. The memory 1305 may be any electronic component capable of storing electronic information. The memory 1305 may be embodied as RAM, ROM, magnetic disk storage media, optical storage media, flash memory devices in RAM, on-board memory included with the processor, EPROM, EEPROM, registers, and so forth, including combinations thereof.

Data 1307 and instructions 1309 may be stored in the memory 1305. The instructions 1309 may be executable by the processor 1303 to implement the methods disclosed herein. Executing the instructions 1309 may involve the use of the data 1307 that is stored in the memory 1305. When the processor 1303 executes the instructions 1309, various portions of the instructions 1309-*a* may be loaded onto the processor 1303, and various pieces of data 1307-*a* may be loaded onto the processor 1303.

The wireless communication device 1301 may also include a transmitter 1311 and a receiver 1313 to allow transmission and reception of signals to and from the wireless communication device 1301. The transmitter 1311 and receiver 1313 may be collectively referred to as a transceiver 1315. Multiple antennas, such as antennas 1317-*a* and 1317-*b*, may be electrically coupled with the transceiver 1315. The wireless communication device 1301 may also include (not shown) multiple transmitters, multiple receivers and/or multiple transceivers.

The various components of the wireless communication device 1301 may be coupled together by one or more buses, which may include a power bus, a control signal bus, a status signal bus, a data bus, etc. For the sake of clarity, the various buses are illustrated in FIG. 13 as a bus system 1319. It should be noted that these methods describe possible implementations, and that the operations and the steps may be rearranged or otherwise modified such that other implementations are possible. In some cases, aspects from two or more of the methods may be combined. For example, aspects of each of the methods may include steps or aspects of the other methods, or other steps or techniques described herein. Thus, aspects of the disclosure may provide for receiving on transmit and transmitting on receive. Although some operations or functions described herein were discussed with reference to a base station, it should be understood that a UE, such as wireless communication device 1301, may perform the corresponding transmitting that is received and monitored by the base station as well as the receiving of the information indicated by the base station described herein and may be implemented in hardware, software executed by a processor like the processor 1303 described in FIG. 13, or both. The functions described herein in the flowcharts of FIGS. 7-11 may be implemented in hardware, software executed by a processor like the processor 1303 described in FIG. 13, or a combination thereof by a wireless communication device 1301.

The description herein is provided to enable a person skilled in the art to make or use the disclosure. Various modifications to the disclosure may be readily apparent to those skilled in the art, and the generic principles defined herein may be applied to other variations without departing from the scope of the disclosure. Thus, the disclosure is not to be limited to the aspects and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, EEPROM, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc, where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of base stations provide coverage for various geographical regions. For example, each base station or base station may provide communication coverage for a macro cell, a small cell, or other types of cell. The term "cell" is a 3GPP term that may be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) operation (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Aspects of the disclosure may provide for receiving on transmit and transmitting on receive. It should be noted that these methods describe possible implementations, and that the operations and the steps may be rearranged or otherwise modified such that other implementations are possible. In some aspects, aspects from two or more of the methods may be combined.

The various illustrative blocks and modules described in connection with the disclosure herein may be implemented or performed with a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various aspects, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. An apparatus for wireless communications, comprising:
means for identifying a first set of resources for a first transmission using a first communication protocol;
means for identifying an overlap in time between the first set of resources and a second set of resources for a second transmission using a second communication protocol, wherein the first communication protocol is associated with a lower latency than the second communication protocol;
means for processing the first transmission and the second transmission based at least in part on the overlap, wherein the means for processing comprises means for refraining from transmitting the second transmission in the second set of resources based at least in part on the overlap; and
means for transmitting the first transmission based at least in part on the processing, wherein the first transmission is transmitted in the first set of resources.

2. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the processing comprises:
refraining from transmitting the second transmission in the second set of resources based at least in part on the overlap, wherein the first transmission is transmitted in the first set of resources.

3. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the processing comprises:
rate matching the second transmission around the first set of resources for the first transmission based at least in part on the overlap; and
transmitting the second transmission based at least in part on the rate matching, wherein the first transmission is transmitted in the first resource and the second transmission is transmitted on a subset of the second set of resources distinct in time from the first set of resources.

4. The method of claim 3, wherein the rate matching comprises puncturing the second transmission for at least one symbol of the second set of resources with the first transmission, the method further comprising:
inserting a demodulation reference signal symbol into the second transmission following the first resource based at least in part on the puncturing the second transmission for the at least one symbol of the second set of resources with the first transmission, wherein the demodulation reference signal is inserted into a first symbol of the second set of resources that directly follows the first set of resources, a symbol of the second set of resources preceding a subsequent frequency hop of the second transmission, or a combination thereof.

5. The method of claim 3, further comprising:
disabling frequency hopping for the second transmission based at least in part on the rate matching.

6. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the processing comprises:
allocating a first transmit power for the first transmission using the first communication protocol based at least in part on a block error rate target;
determining a second transmit power for the second transmission using the second communication protocol based at least in part on the allocated first transmit power and a maximum transmit power; and
transmitting the second transmission concurrently with at least a portion of the transmitting the first transmission based at least in part on the overlap.

7. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the first set of resources overlaps in time with a third set of resources comprising at least a portion of uplink control information for the second communication protocol, the method further comprising:
transmitting at least the portion of uplink control information for the second communication protocol in a portion of the second set of resources different from the third set of resources; and
rate matching data for the second transmission following the first set of resources around the at least the portion of uplink control information based at least in part on the first set of resources overlapping in time with the third set of resources comprising the at least the portion of uplink control information.

8. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap;
transmitting the first transmission based at least in part on the processing,
determining that concurrent transmission of the first transmission and the second transmission is disabled;
transmitting the second transmission in the second set of resources, wherein uplink control information for the first transmission using the first communication protocol is also transmitted in the second set of resources; and
disabling frequency hopping based at least in part on the determining that the concurrent transmission is disabled.

9. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the second set of resources comprises a plurality of frequency hopped resources and the transmitting the first transmission comprises:
transmitting redundant coded bits of uplink control information for the first communication protocol in each frequency hopped resource of the plurality of frequency hopped resources, wherein data for the first communication protocol in each frequency hopped resource of the plurality of frequency hopped resources is self-decodable based at least in part on the respective redundant coded bits of uplink control information.

10. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the second set of resources comprises a plurality of frequency hopped resources and the processing comprises:
mapping coded bits of uplink control information associated with the first communication protocol, coded bits of data associated with the first communication protocol, or a combination thereof to a first frequency hopped resource of the plurality of frequency hopped resources.

11. The method of claim 10, wherein a first bandwidth, a first time span, or both of the first frequency hopped resource of the plurality of frequency hopped resources are larger than a second bandwidth, a second time span, or both for at least one other frequency hopped resource of the plurality of frequency hopped resources.

12. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the second set of resources comprises a plurality of frequency hopped resources and the processing comprises:
mapping coded bits of hybrid automatic repeat request acknowledgment associated with the first communication protocol to a first frequency hopped resource of the plurality of frequency hopped resources.

13. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the processing comprises:
refraining from transmitting the second transmission in the second set of resources based at least in part on the overlap, wherein the first transmission is transmitted in the second set of resources.

14. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the first transmission comprises data for the first communication protocol and the second transmission comprises uplink control information for the second communication protocol.

15. The method of claim 14, wherein the processing comprises:
determining whether to transmit the first transmission in the second set of resources based at least in part on a time span of the second set of resources, a coding gain associated with the second set of resources, or a combination thereof.

16. The method of claim 14, wherein the processing comprises:
refraining from transmitting at least a first portion of the second transmission in the second set of resources based at least in part on the overlap; and
transmitting at least a second portion of the second transmission in the second set of resources based at least in part on a priority level of the second portion of the second transmission.

17. The method of claim 14, wherein the processing comprises:
indicating the uplink control information for the second communication protocol using resource selection for transmitting the data for the first communication protocol, using multiplexing with a demodulation reference signal for the data for the first communication protocol, or using a combination thereof.

18. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein the first transmission comprises data for the first communication protocol and the second transmission comprises a scheduling request, a buffer status report, or a combination thereof for the second communication protocol.

19. The method of claim 18, wherein the processing comprises:
jointly encoding the scheduling request, the buffer status report, or the combination thereof for the second communication protocol with the data for the first communication protocol.

20. The method of claim 18, wherein the processing comprises:
transmitting the scheduling request, the buffer status report, or the combination thereof for the second communication protocol in the first set of resources with the data for the first communication protocol.

21. The method of claim 18, wherein the processing comprises:
indicating the scheduling request, the buffer status report, or the combination thereof for the second communication protocol using resource selection for transmitting the data for the first communication protocol.

22. A method for wireless communications, comprising:
identifying a first set of resources for a first transmission using a first communication protocol;
identifying an overlap in time between the first set of resources and a second set of resources for a second transmission using a second communication protocol, wherein the first communication protocol is associated with a lower latency than the second communication protocol;
processing the first transmission and the second transmission based at least in part on the overlap; and
transmitting the first transmission based at least in part on the processing, wherein
the first communication protocol comprises an ultra-reliable low-latency communication protocol; and
the second communication protocol comprises an enhanced mobile broadband protocol.

23. A non-transitory computer-readable medium for storing code for wireless communications, the code comprising instructions executable by a processor to:
identify a first set of resources for a first transmission using a first communication protocol;
identify an overlap in time between the first set of resources and a second set of resources for a second transmission using a second communication protocol, wherein the first communication protocol is associated with a lower latency than the second communication protocol;

process the first transmission and the second transmission based at least in part on the overlap;
refrain from transmitting the second transmission in the second set of resources based at least in part on the overlap; and
transmit the first transmission based at least in part on the processing, wherein the first transmission is transmitted in the first set of resources.

24. An apparatus for wireless communications, comprising:
a processor;
memory coupled with the processor; and
instructions stored in the memory and executable by the processor to cause the apparatus to:
identify a first set of resources for a first transmission using a first communication protocol;
identify an overlap in time between the first set of resources and a second set of resources for a second transmission using a second communication protocol, wherein the first communication protocol is associated with a lower latency than the second communication protocol;
process the first transmission and the second transmission based at least in part on the overlap; and
transmit the first transmission based at least in part on the processing, wherein the instructions to process the first transmission and the second transmission are further executable by the processor to cause the apparatus to:
refrain from transmitting the second transmission in the second set of resources based at least in part on the overlap, wherein the first transmission is transmitted in the first set of resources.

25. An apparatus for wireless communications, comprising:
a processor;
memory coupled with the processor; and
instructions stored in the memory and executable by the processor to cause the apparatus to:
identify a first set of resources for a first transmission using a first communication protocol;
identify an overlap in time between the first set of resources and a second set of resources for a second transmission using a second communication protocol, wherein the first communication protocol is associated with a lower latency than the second communication protocol;
process the first transmission and the second transmission based at least in part on the overlap; and
transmit the first transmission based at least in part on the processing, wherein the instructions to process the first transmission and the second transmission are further executable by the processor to cause the apparatus to:
rate match the second transmission around the first set of resources for the first transmission based at least in part on the overlap; and
transmit the second transmission based at least in part on the rate matching, wherein the first transmission is transmitted in the first resource and the second transmission is transmitted on a subset of the second set of resources distinct in time from the first set of resources.

26. An apparatus for wireless communications, comprising:
a processor;
memory coupled with the processor; and
instructions stored in the memory and executable by the processor to cause the apparatus to:
identify a first set of resources for a first transmission using a first communication protocol;
identify an overlap in time between the first set of resources and a second set of resources for a second transmission using a second communication protocol, wherein the first communication protocol is associated with a lower latency than the second communication protocol;
process the first transmission and the second transmission based at least in part on the overlap; and
transmit the first transmission based at least in part on the processing, The apparatus of claim 23, wherein the instructions to process the first transmission and the second transmission are further executable by the processor to cause the apparatus to:
allocate a first transmit power for the first transmission using the first communication protocol based at least in part on a block error rate target;
determine a second transmit power for the second transmission using the second communication protocol based at least in part on the allocated first transmit power and a maximum transmit power; and
transmit the second transmission concurrently with at least a portion of the transmitting the first transmission based at least in part on the overlap.

27. An apparatus for wireless communications, comprising:
a processor;
memory coupled with the processor; and
instructions stored in the memory and executable by the processor to cause the apparatus to:
identify a first set of resources for a first transmission using a first communication protocol;
identify an overlap in time between the first set of resources and a second set of resources for a second transmission using a second communication protocol, wherein the first communication protocol is associated with a lower latency than the second communication protocol;
process the first transmission and the second transmission based at least in part on the overlap; and
transmit the first transmission based at least in part on the processing, wherein the second set of resources comprises a plurality of frequency hopped resources and the instructions to transmit the first transmission are further executable by the processor to cause the apparatus to:
transmit redundant coded bits of uplink control information for the first communication protocol in each frequency hopped resource of the plurality of frequency hopped resources, wherein data for the first communication protocol in each frequency hopped resource of the plurality of frequency hopped resources is self-decodable based at least in part on the respective redundant coded bits of uplink control information.

28. An apparatus for wireless communications, comprising:
a processor;
memory coupled with the processor; and
instructions stored in the memory and executable by the processor to cause the apparatus to:
identify a first set of resources for a first transmission using a first communication protocol;
identify an overlap in time between the first set of resources and a second set of resources for a second transmission using a second communication protocol, wherein the first communication protocol is associated with a lower latency than the second communication protocol;
process the first transmission and the second transmission based at least in part on the overlap; and
transmit the first transmission based at least in part on the processing, wherein the second set of resources comprises a plurality of frequency hopped resources and the instructions to process the first transmission and the second transmission are further executable by the processor to cause the apparatus to:
map coded bits of uplink control information associated with the first communication protocol, coded bits of data associated with the first communication protocol, or a combination thereof to a first frequency hopped resource of the plurality of frequency hopped resources.

* * * * *